United States Patent
Durst, Jr. et al.

(10) Patent No.: US 6,542,933 B1
(45) Date of Patent: Apr. 1, 2003

(54) SYSTEM AND METHOD OF USING MACHINE-READABLE OR HUMAN-READABLE LINKAGE CODES FOR ACCESSING NETWORKED DATA RESOURCES

(75) Inventors: Robert T. Durst, Jr., Fort Myers, FL (US); Kevin Hunter, Fort Myers, FL (US); Steven Kearns, Fort Myers Beach, FL (US)

(73) Assignee: Neomedia Technologies, Inc., Fort Myers, FL (US)

( * ) Notice: Subject to any disclaimer, the term of this patent is extended or adjusted under 35 U.S.C. 154(b) by 0 days.

(21) Appl. No.: 09/543,178

(22) Filed: Apr. 5, 2000

Related U.S. Application Data
(60) Provisional application No. 60/127,779, filed on Apr. 5, 1999.

(51) Int. Cl.[7] .............................................. G06F 15/16
(52) U.S. Cl. ..................... 709/229; 709/203; 709/217; 709/219; 709/225; 709/226; 707/9; 707/10
(58) Field of Search ................................. 709/203, 217, 709/219, 225, 226, 229; 707/9, 10

(56) References Cited

U.S. PATENT DOCUMENTS

| | | | |
|---|---|---|---|
| 5,640,193 A | 6/1997 | Wellner | |
| 5,804,803 A | * 9/1998 | Cragun et al. | ............... 235/375 |
| 5,812,776 A | 9/1998 | Gifford | |
| 5,905,248 A | * 5/1999 | Russell et al. | ......... 235/462.27 |
| 5,913,210 A | 6/1999 | Call | |
| 5,933,829 A | * 8/1999 | Durst et al. | |
| 5,938,727 A | 8/1999 | Ikeda | |
| 5,978,773 A | * 11/1999 | Hudetz et al. | ................ 705/23 |
| 5,986,651 A | * 11/1999 | Reber et al. | ................ 345/335 |
| 6,012,102 A | 1/2000 | Shachar | |
| 6,027,024 A | * 2/2000 | Knowles | ................ 235/472.01 |
| 6,064,979 A | * 5/2000 | Perkowski | ................... 705/26 |
| 6,076,733 A | * 6/2000 | Wilz, Sr. et al. | ........ 235/462.01 |
| 6,101,486 A | * 8/2000 | Roberts et al. | ............... 705/27 |
| 6,108,656 A | * 8/2000 | Durst et al. | ................... 707/10 |

* cited by examiner

*Primary Examiner*—Saleh Najjar
(74) *Attorney, Agent, or Firm*—Anthony R. Barkume, P.C.

(57) ABSTRACT

The present invention operates by inputting into the client computer a linkage code (a machine readable code such as a bar code symbol or a human-readable alphanumeric text string) that includes a server identification code and an item identification code. The client computer then extracts the server identification code, and obtains from local cache or from the routing server a URL template associated with the server identification code. The URL template includes the name of an information server and at least one parameter field to be completed by the client computer. The URL template is completed by the client computer by filling in at least the item identification code, and the completed URL template is then sent to the information server named therein as a primary content URL request.

58 Claims, 13 Drawing Sheets

| SID | TYPE | IID | ORDER | VSID | VIID | RULE | MAP |
|-----|------|-----|-------|------|------|------|-----|
| 10 | NEO | 10 | 0 | | | | www.xyz.com |
| 10 | NEO | 11 | 0 | Coke Islt | Y | | www.coke.com |
| 10 | NEO | 11 | 1 | | | 2 | www.coke.com/spanish |
| 10 | NEO | 11 | 2 | | | 4 | www.coke.com/YM |
| 10 | NEO | 12 | 0 | Pepsi | | | www.pepsi.com |

Define Simple Rule
Rule Name: [Spanish Women    ]

|   | Age is: | [X]Anything | [o]Not provided | [o]between[_]and[_] |
|---|---|---|---|---|
| and | Gender is: | [o]Anything | [o]Not provided | [X][Woman] |
| and | Lang is: | [o]Anything | [o]Not provided | [X][Spanish] |
| and | Region is: | [X]Anything | [o]Not provided | [o][drop down list] |

[Add Rule] [Reset from]

FIG.16

Define Compound Rule
Rule Name: [French & German Women  ]

[-]Young Male
or [-]Young Female
or [-]Elderly
or [X]French Female
or [-]French Male
or [X]German Female
or [-]German Male
or [-]Southwest USA
or [-]Southeast USA

[Add Rule] [Reset from]

Code Mapping

Item ID: 123
Vanity Code: [VSID drop down][ ][VID]
Map: [http://www.coke.com ][V]  ][X] URL[o]File ]
Description: [Main Coke page Profiled Routing:
Rule: [Spanish ][V]
Map: [http://www.coke.com/spanish ][V]  ][X] URL[o]File ]
Description: [Spanish page Rule: [Young Male ][V]
Map: [http://www.coke.com/YM ][V]  ][X] URL[o]File ]
Description:[Coke for young males Rule: [Female ][V]
Map: [http://www.coke.com/Female ][V]  ][X] URL[o]File ]
Description:[Coke for Females Rule: [
Map: [  ][X] URL[o]File ]
Description: [

(continued down to rule 10)
[Update] [Reset from]

602

600

SYSTEM AND METHOD OF USING MACHINE-READABLE OR HUMAN-READABLE LINKAGE CODES FOR ACCESSING NETWORKED DATA RESOURCES

CROSS REFERENCE TO RELATED APPLICATIONS

This application is based on and claims filing priority of co-pending U.S. Provisional Application Serial No. 60/127,779, filed on Apr. 5, 1999, entitled, SYSTEM AND METHOD OF USING INDEXED INFORMATION ENCODED IN A MACHINE-READABLE SYMBOL FOR LINKING TO NETWORK RESOURCES, which is incorporated by reference herein.

BACKGROUND OF THE INVENTION

This application relates to the use of machine-readable indicia and codes such as bar codes, RF-ID tags and the like, for linking to distributed data resources residing on a server in a networked computing environment such as the Internet.

Packaged products have been historically identified by marking the packaging with a part number, serial number or other identification indicia in order to determine the contents of the package without causing an end user or a handler to open the package. Radio frequency tags, plastic cards with magnetic stripes, and bar codes are frequently utilized in industry to mark packages to allow automated reading and decoding of identification indicia using a scanning device such as an optical wand, portable scanner, magnetic stripe reader or wireless transmission system. During the purchase of a product for example, a bar code symbol is scanned using the scanning device, and then decoded into a string of characters, where the characters are then sent to a computer for retrieval of related product information that was previously stored in a database of the computer. The Universal Product Code symbol (UPC) is one form of a bar code that is commonly used in industry where the symbol is applied by the manufacturer and is subsequently used to trace the product from its initial manufacture through to delivery. The product is shipped from a manufacturers location through a plurality of distribution channels to wholesale or retail shopping sites where the products are ultimately purchased by the consumer.

This identification indicia only provides value to those business partners that can properly interpret the encoded data and that have a copy of the product database that contains the corresponding product code. End users or purchasers of products do not typically have access to this product information and must instead rely on printed information contained on the readable parts of the packaging to determine product information. A user requiring more detailed information than is identified on the package may be able to contact the manufacturer and personally request the information required by asking specific questions about a particular model and serial number of a product. This is a rather cumbersome process because the user may have to write down all of the product information and then find the name of the manufacturer, look up the phone number for the company's sales department, then request information regarding the specific product of interest. Alternatively, with the proliferation of Internet-based information resources, a user may locate a company's web page and search for the product by entering the part number, model number and serial number referred to on the product package if the company supports such search requests. In order to use the Internet to find this product information, the user must first identify the Universal Resource Locator (URL) of the manufacturer. Since not all companies have URL identifiers matching the company name or the name under which the product is sold, it is not always easy to identify the actual URL that would have the information desired. In addition, product and brand web sites are frequently located under the domain name of the brand's holding company, rather than the brand name, complicating the search. Once a web site identified by the URL is accessed, the user may have to navigate through a series of web pages to get to the appropriate web page that corresponds to the product part number, model number and serial number. This process may be complicated by the fact that full identification of a product, such as the part number or model number, may only be on the product itself, and not on the exterior of the product packaging. Thus, a consumer attempting to perform pre-purchase research may have difficulty finding the specific product desired. Exterior packaging is typically marked with a unique code such as the UPC or EAN code, however since the consumer generally lacks access to the code-to-product database, and manufacturers rarely categorize their sites by this number, this mark is of little use to the consumer.

The machine readable identification indicia may be made up of character and numeric data that provides value when interpreted according to a correlated database. When actual product data such as part numbers and model numbers are encoded into bar code symbols for example, the text or characters are represented using machine understood encoding and decoding algorithms. While this machine-readable identification indicia may provide more detailed information to users that can interpret the symbols, it is desirable to use shorter symbols that are easily remembered or entered by users without requiring sophisticated peripheral hardware devices.

What is desired therefore is a system that may be utilized by end users or clients to retrieve product and other types of information by allowing the client to enter easily discernable indicia that is associated with a product symbol into a client computer to look up product information from a destination address associated with the user entered indicia. The symbol data is preferably defined such that it has a short length that may be rapidly entered by a user from his computing device. Preferably the computing device is connected to a network of computers such that data read from the symbol or the associated readable text of the symbol may be used to lookup information about that identified product on virtually any server computer interconnected to the network. These symbols may be applied to any item that requires identification at any point in the distribution channel, such that extended content may be associated with it.

It is a further object of the invention to be able to link existing product codes and indicia with data resources on a network.

It is a further object of the invention to be able to customize the data and product information that is provided to a user whereby the entry of a particular indicia or code results in the return of different data resources, depending on a profile associated with the user.

It is another object of the present invention that a universal coding system may be employed to support the lookup of specific manufacturer and product information without entering a long sequence of terms.

SUMMARY OF THE INVENTION

Provided is a method and system for providing a data resource referred to as a primary content file from a content server computer to a client computer, both of which are interconnected over a computer network, wherein an information server computer, a routing server computer, and a registration server computer are also interconnected to the network to assist in providing the primary content file. The present invention operates by inputting into the client computer a linkage code that includes a server identification code and an item identification code. The client computer extracts the server identification code from the linkage code, and then obtains a URL template associated with the server identification code. The URL template includes the name of an information server and at least one parameter field to be completed by the client computer. The URL template is completed by the client computer by filling in at least the item identification code obtained from the linkage code, and the completed URL template is then sent as a primary content URL request to the information server named therein. At the information server, the location of the primary content file is determined based at least on the item identification code, and the information server redirects the client computer to the content server to retrieve the primary content file. Alternatively, the information server retrieves the primary content file from local storage and sends it directly to the client without the need for redirection to the content server computer.

The linkage code may be a machine-readable code such as a bar code symbol, which is scanned by a bar code scanning device connected to the client computer. In the alternative, the linkage code may be a human-readable alphanumeric text string that is typed into the keyboard of the client computer.

After entering the linkage code, the client computer first attempts to retrieve the URL template from a local cache. The local cache has a plurality of template records, each record having a server identification code, an associated URL template, and an expiration date. The client computer uses the server identification code extracted from the linkage code to retrieve the associated URL template and expiration date. The template record is not used, however, if the current date is later than the expiration date. In this event, or if there is no entry for that server identification code in the local cache (or if local cache is not implemented), then the URL template is retrieved from the routing server on the network.

When the routing server is used, it will access a template database and return to the client computer a URL template and a current expiration date associated with the server identification code. The client computer then updates the local cache with the URL template and the current expiration date received from the routing server.

In addition to the item identification code, the URL template may be completed by the client computer by filling in certain user data. The user data may be a user identification number, and may also include information such as the gender of the user, the age of the user, the preferred language of the user, certain predefined interests of the user, and/or the geographic location of the user. The user data is retrieved from memory in the client computer, or it may be retrieved from a user database located on the registration server, wherein the user database is populated by the users during a registration process.

Once the completed URL template is received by the information server, it may use, in addition to the item identification code, the populated user data in order to generate and/or determine the location of the primary content file.

The client computer is redirected to the content server by the information server when it sends a primary URL to the client computer indicating the location of the primary content file (i.e. the URL). The information server may log the primary content URL request in a hit log. The information server may then communicate with the registration server to obtain further information linked to a user identification code from the hit log and thus determine more about the user that entered the linkage code.

In order to provide increased system security, the user identification code may be obfuscated prior to being sent to the information server. The obfuscated user identification code is sent from the information server to the registration server, where the user identification code is de-obfuscated and the user identification information is provided to the information server.

BRIEF DESCRIPTION OF THE DRAWING

FIG. 16 is a sample interface for rule definition of the present invention;

FIG. 17 is a sample interface for compound rule definition;

FIG. 18 is a sample interface for managing and defining relationships between rules and linkage codes.

DETAILED DESCRIPTION OF THE PREFERRED EMBODIMENT

Figure 1:
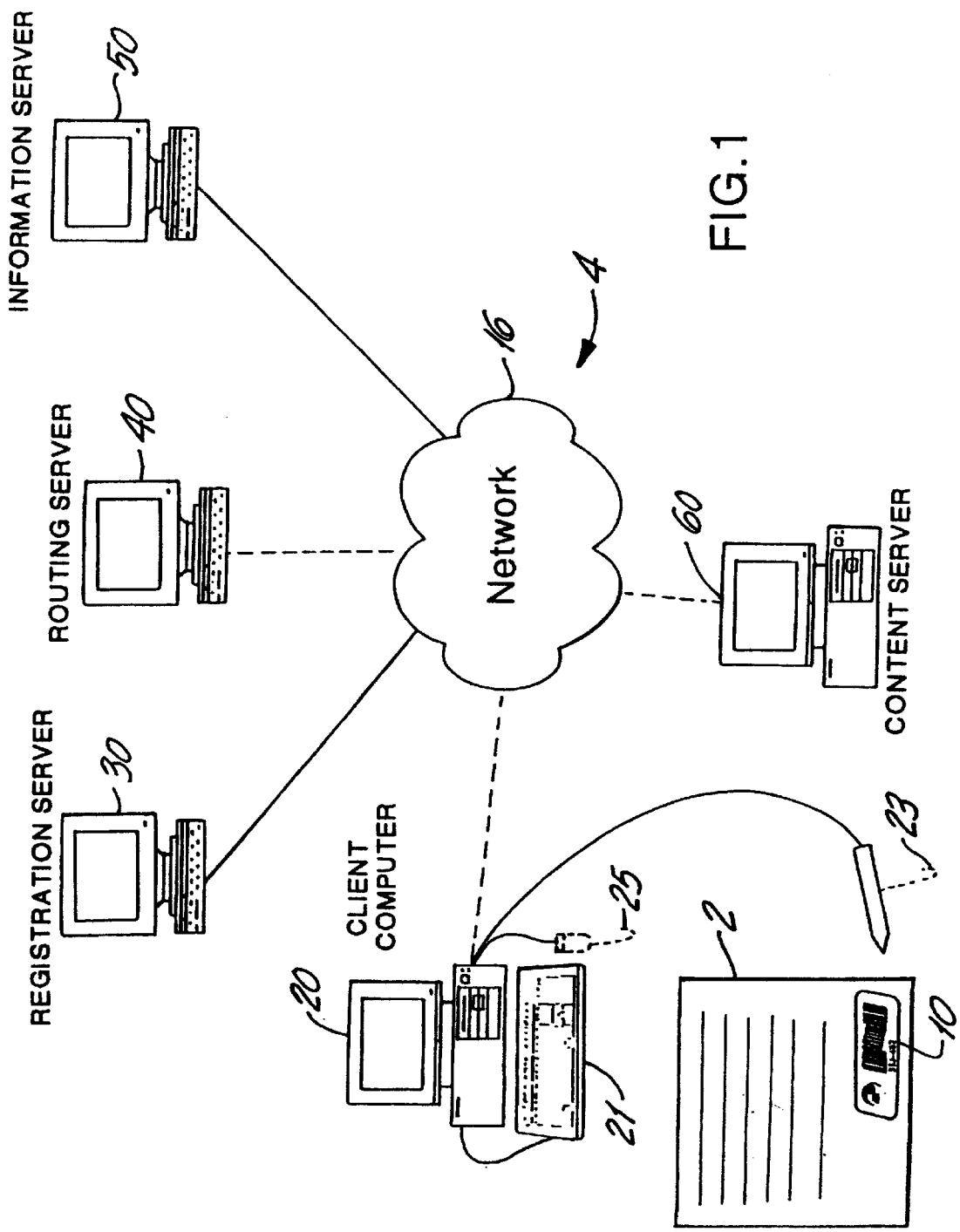
FIG. 1 is a top-level system diagram of the main components for the linkage system of the preferred embodiment of the present invention.
Figure 2:
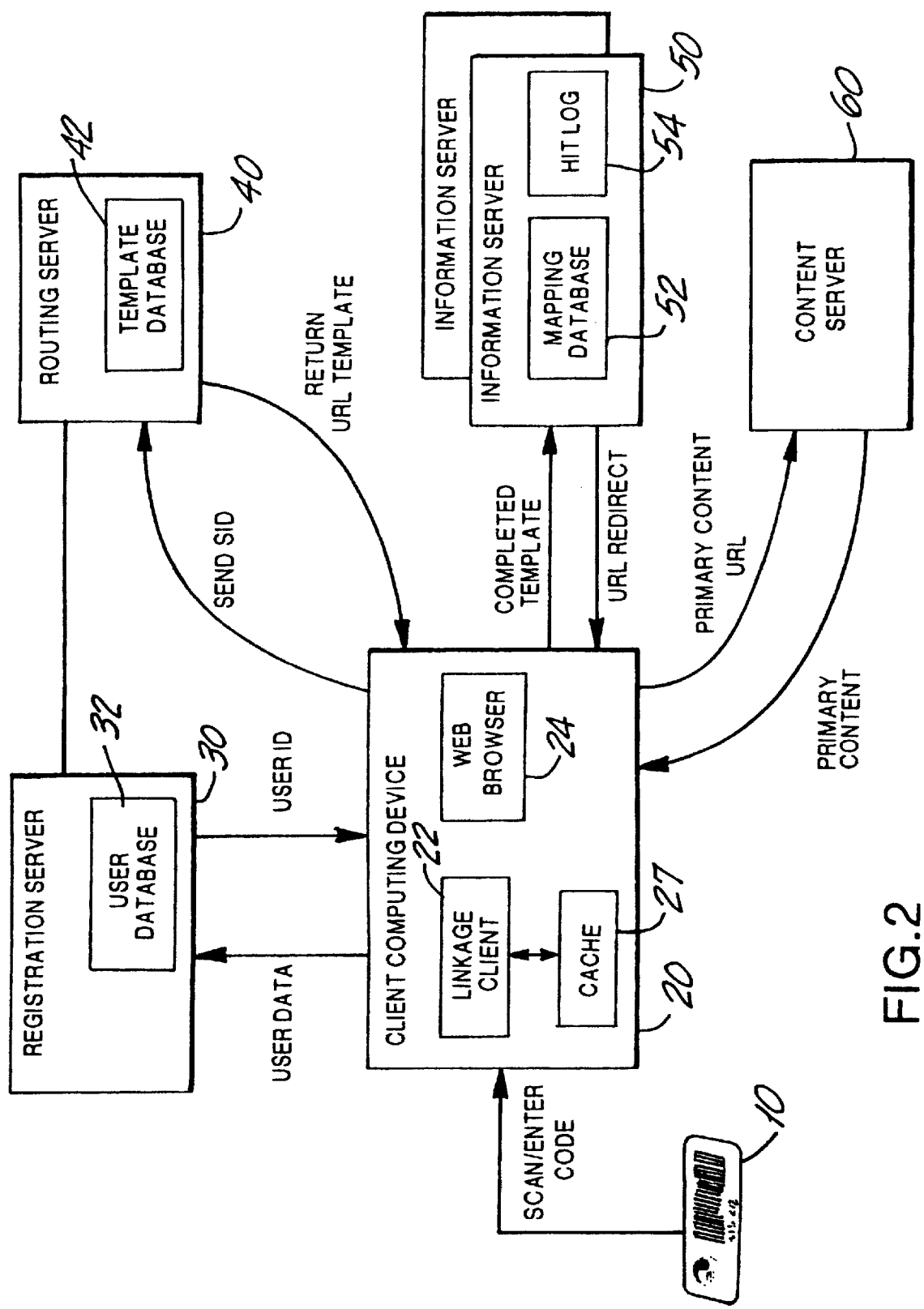
FIG. 2 is a representation of the system components of the present invention and the main data flows between components.

With regard to FIGS. 1 and 2, the system of the present invention is designed as an aid to individuals who are looking for data content such as a web page (referred to as primary content) from a networked content server 60. The primary content may for example be related to an item 2, and a machine-readable or human-readable linkage code 11 contained within a linkage code symbol 10 associated with the item 2 may be processed by the various components of present invention to generate a URL suitable for processing by a web browser 24 to access the content web server 60 and obtain the primary content file.

The item 2 may be anything with which a linkage code symbol 10 may be associated, such as a document on which the linkage code symbol 10 is printed, an item of commerce having an associated UPC code, and the like. A document may of course be an advertisement, a brochure, a card mailing, a business card, etc. In addition, the data elements (i.e. linkage codes 11) contained by the linkage code symbol 10 may be embodied as an encoded RF-ID tag, which is attached to a product or its packaging much in the same manner as a UPC bar code (so-called electronic product codes). The present invention can use any type of code or index capable of being input into a computer device to obtain the linked primary content file.

The linkage system 4 comprises a client computer 20, a registration server computer 30, a routing server computer 40, an information server computer 50, and a content server computer 60, all of which are interconnected for selective communication with each other as required by the system 4 over a computer network 16 such as the Internet. Various embodiments of the linkage system 4 may also be implemented over other types of distributed computing networks such as an intranet, a wireless network, and various combinations thereof.

The client computer 20 may be any type of computing device capable of accessing the network 16 such as a personal computer connected to the Internet by any of various means available. The client computer may also be a web-enabled cell phone, PDA, etc. The client computer 20 is configured to execute web browser software 24 and linkage client software 22. The client computer 20 also includes data entry devices such as a keyboard 21, a bar code scanning wand 23, and a mouse 25 for entry of the linkage codes 11 as desired.

The web browser 24 is a standard web browser executing on the client computer 20. Currently, the supported browsers are the Microsoft Internet Explorer (version 5.0), Netscape Navigator (version 4.0) and Netscape Communicator. The linkage client 22 is a software utility installed on the client computer 20, that accepts linkage codes 11 such as typed-in data entry of digit strings 106, scanned native linkage codes 104 (see FIG. 3), UPC bar codes 105 (see FIGS. 5 and 6), and vanity codes 103, and works with the routing server 40 to generate URLs that are sent to the web browser.

Figure 3:
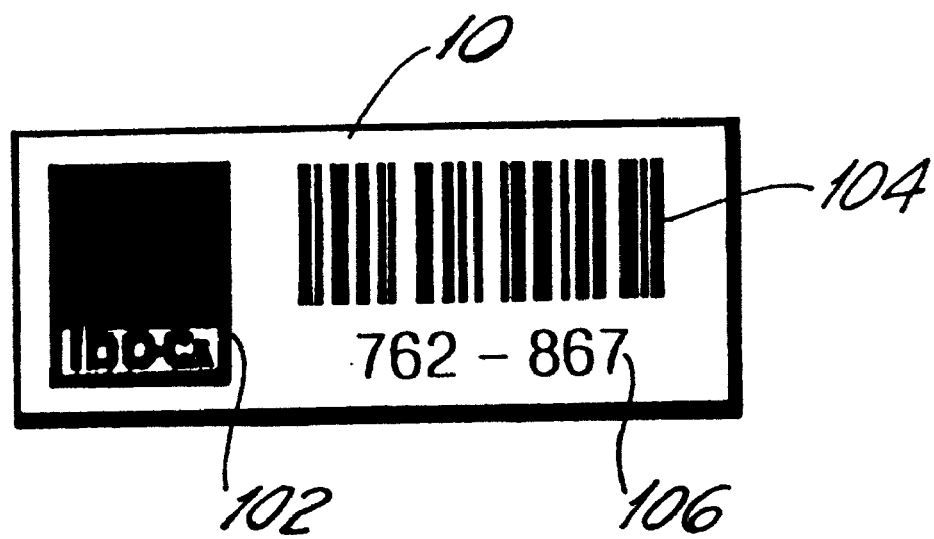
FIG. 3 is a representation of a linkage code symbol that is preferably used with this system.

The linkage code symbol 10 comprises an optional logo 102, which may indicate the source of the commercial service provider that operates the linkage system, an advertiser, etc. The linkage code symbol 10 must contain at least one, if not a combination of, the four types of linkage codes 11 contemplated by this invention. The first type of linkage code 11 is a native linkage code 104, which is a dedicated bar code symbol explained in further detail herein. The second type of linkage code 11 is a digit string 106, which will usually contain the same alphanumeric text that is encoded in the native linkage code 104. By printing both the native linkage code 101 and the digit string 106 in one linkage code symbol 10 as shown in FIG. 3, the user has the option of either typing in the digit string 106 into the keyboard 21 or scanning the native linkage code 104 with a bar code scanner 23 if one is available. Thus, the present invention can be used whether or not a scanner is available.

The third type of linkage code 11 is a UPC bar code 105, and the fourth type is a vanity code 103, which are explained in further detail below. These types of linkage codes 11 operate in a similar fashion as well.

When the term linkage code is used herein, it is generally meant to include any of these four types of codes unless the context indicates otherwise.

The information server 50 is configured, as explained in detail below, to receive a completed URL template from the client computer 20 and transmit a response to the client computer 20 which may be the desired primary content file or a URL that redirects the web browser 24 to a content server 60 that has the primary content file stored thereon. The content web servers 60 may contain the web content that is ultimately sent to the web browser 24, and need not be configured in any special way in order to operate with the linkage system 4. That is, the content server 60 receives a data request in the form of a URL and responds by supplying the requested web content.

The system also has a registration server computer 30 for managing registration and demographic information of the users of this system. A rules database may additionally be a component of the system, where the rules stored therein are utilized to help determine the web content ultimately returned to the client computer 20.

The information server 50 is a server system that executes a software utility that installs on an information provider's web site. The information provider's web site comprises a typical server such as a UNIX workstation connected to the Internet network running a web server that permits users to access the programs and access files. Target or destination servers have generally the same physical configuration but do not necessarily have the information server utility running in memory. The URLs generated by the linkage client 22 and web browser 24 of the present invention are typically references to content accessed by this program that are stored on this server or on the content server 60. This information server utility program decodes the URL, determines via a local database the web content associated with the code entered by the user, and arranges for the browser to display this content. In addition, this software makes a record of each "hit", recording the date, time, item accessed and a user ID indicating who made the access, in a hit log database 54. The information server 50 may be implemented as a CGI program or Java servlet, compatible with both UNIX and Windows NT or via other conventional means. The overall system will contain multiple information servers 50 that are chosen based on the data entered though the linkage client 22.

The linkage codes 11 contained in the linkage code symbol 10 (i.e. the native linkage code 104, the digit string 106, the UPC bar code 105, and/or the vanity code 103) do not have the URL of the desired primary content file encoded directly in them. The routing server 40 is responsible for supporting the mapping between the respective data elements of the linkage code symbols 10 and the web site on which the corresponding information server 50 is installed. The linkage client 22 queries the routing server 40 for this information if required, as part of the process of generating a URL. The routing server 40 may be implemented as an ISAPI DLL running on a web server maintained by a system administrator. The routing server 40 additionally accesses a template database 42 where the template for the URL is stored. While the system may contain multiple routing servers 40 for load balancing, fault tolerance, and to support geographic service areas, from a functional point of view the system will be described with respect to only a single routing server 40.

Every user of the linkage system 4 is required to register with the registration server 30, providing a variety of demographic data that is stored in a user database 32. The registration process is a cooperative effort between the client, web browser and the registration server 30, and results in a unique user ID being issued to the client. This user ID may be required for certain queries to information servers 50. The registration server 30 is preferably implemented as an ISAPI DLL running on a web server, communicating with a Microsoft SQL Server database via ODBC. While the system may eventually contain multiple registration servers 30 for load balancing, fault tolerance and in accordance with geographic considerations, from a functional point of view there is only a single registration server 30.

The linkage client 22 and the web browser 24 execute on a computing device 20 that may be any device that allows a user or client of the system to interact with other networked computers. The device could be any wireless communication device, personal computing device, network terminal or any other device that comprises at a minimum: communicating means for communicating with other computing devices, processor means for executing processes related to the processing of linkage codes, input means for allowing users to enter linkage codes in some form, memory map means for storing data associated with processing linkage codes, and display means to display the resulting content that is of interest to the user that is returned from one or more computing devices. For example, in the preferred embodiment, the communication means is an analog or digital modem or network card that interacts with the operating system of the client computer 20 that executes processes that enable the communicating means to reach the destination address determined by the processing means. A user on a personal computer could therefore connect to a network by dialing in to a local Internet service provider (ISP) where the linkage client 22 and the web browser 24 on the client computer 20 would be able to interact with data elements of the symbol data 10 entered via the linkage client 22. The memory map means may refer to any storage such as hard drives, removable media, remote storage facilities that may be accessible via the system of the present invention for storing or retrieving information.

The system of the present invention is adapted to operate on operating systems such as provided by Windows, Unix, and Apple compatible platforms.

In the preferred embodiment, a linkage code symbol 10 is generated with data elements that reference a file location index where the index is able to be resolved into a computer file associated with a web server. This symbol 10 may be applied to any type of media or data carrier 2. For example, products and packaging, documents, catalogs, magazines, books, lottery tickets, coupons, business cards, reference journals, sports trading cards, or electronic media may provide means for having an associated symbol 10 that may be used to access a referenced destination. During operation, given an item comprising an appropriate symbol 10, an input data string is entered or transposed from the data elements of the symbol 10. The linkage client 22 software utility is configured to receive the input data string such as provided in the machine readable native linkage code 104 of the symbol (see FIG. 3) or the human readable digit string 106 of the symbol via keyboard, bar code scanner, or other input means. Typically the client computer 20 or a store kiosk or any other type of device associated with the networked system may be used to enter the linkage code. The linkage client 22 decodes the entered data string to resolve the string into a file location pointer. The linkage client then assembles a file request word that comprises the file location pointer where the file request word is transmitted to the network. The file location pointer comprises a network address portion and a file identifier portion. The file location pointer is stored in the memory map and is looked up by the linkage client by the file location index. The memory map may be associated with RAM or physical disk storage on the user's computer or alternatively the memory map may refer to a location of a secondary server such as a routing server 40. The linkage client may check the local memory map before searching this secondary or auxiliary memory map. This request is transmitted either directly by the linkage client 22 or alternatively it is passed to the web browser 24, which retrieves the appropriate resource by communicating through the Internet. The linkage client 22 is capable of processing native linkage codes 104, UPC codes 105, or user-entered digit string 106 via a keyboard or keypad. Alternative embodiments of the client will also process EAN codes, the European equivalent of UPC codes, ISBN codes, the codes used to uniquely identify books, or other codes commonly used in commercial transactions.

Linkage Codes

Figure 4:
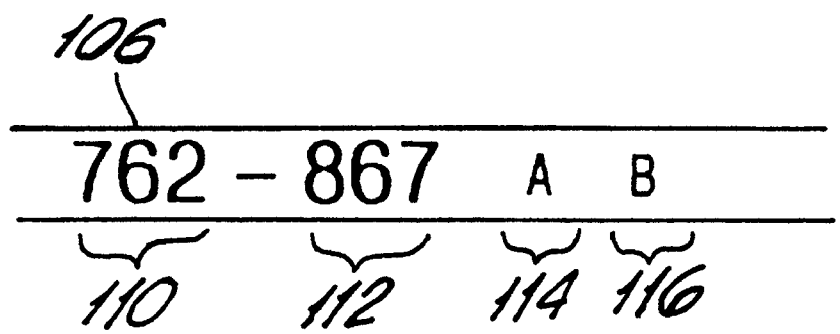
FIG. 4 is an illustration of the components of the linkage code string.

In one embodiment, the linkage code symbol 10 is shown in FIG. 3 and further described in FIG. 4. It contains a logo 102, a native linkage bar code 104 and a printed digit string 106. The bar code 104 is preferably in the "Code 128" symbology, and contains the same data as does the digit string 106 printed below the bar code 104, except that the embedded dashes are omitted. When interpreted, the bar code 104 and digit string 106 typically contain four parts: a Server Identification code (SID) 110, an Item Identification code (IID) 112, a format digit 114, and a checksum digit 116. Note that the drawing shows the constituent components of the code in an unblinded, or "in the clear", format for the sake of clarity and explanantion. In the preferred embodiment, these constituent components are actually obfuscated through a blinding process, as will be described in further detail below.

The SID code 110 uniquely identifies a particular installation of the information server 50 that "owns" or is addressed by this code. The IID code 112 is used by the information server 50 to determine what web content from the destination web server 60 is to be returned. Different information servers 50 may map the same IID code 112 to different content. Thus, only the SID code 110 and IID code 112 together uniquely identify a resource on the web. The operator or administrator of each information server 50 assigns his or her own IID codes 112, and manages the mapping between IID code 112 and web content. The format digit 114 identifies the internal format of the linkage code, allowing for enhancements in the future. The default is null value. The checksum digit 116 allows linkage codes to be distinguished from other digit strings. The default character is a null character.

Linkage codes referring to a file location index are preferably designed to be an even number of digits in length. This is done for two reasons. The first reason is that "code 128" bar codes encode even-length digit strings more efficiently than odd-length digit strings. Thus, a seven-digit "Code 128" bar code is actually longer than an eight-digit "Code 128" bar code. The second reason is that since the linkage code cannot have an odd number of digits, this helps distinguish linkage codes from other codes (EAN13, for example) under certain circumstances. (UPC codes are always of even length, but we designed the blinding algorithm not to produce valid UPC codes. EAN codes come in 13-digit and 8-digit version. The 13-digit form isn't a problem, being odd length. Although the EAN8 was not originally considered when the original blinding algorithm was designed, a revised version of the system uses a combination of rules and tables of known standards that are checked to devise linkage codes via the system that won't pass any of a pre-determined number of existing standards.) A standard UPC code 105 ("UPC-A") is typically comprised of the bars and spaces 120 that make up the code and the human-readable text 122, which are 12 digits in length (see FIG. 5). It contains the following components: a one-digit "Number Series" 124, a five-digit "Manufacturer Number" 126, a five-digit "Item Number" 128 and a single checksum digit 130. At present, public UPC codes 105 begin with a one-digit number series 124 of "0," "6" or "7". For example, codes beginning with "3" are health-care product codes, and are technically managed under a different system than UPC. The UCC is about to start using 1, 8 and 9 for a new series which will have variable-length manufacturer ID's similar to EAN. The linkage system of the present invention may use all existing codes and does not make any distinction of this kind.

Figure 5:
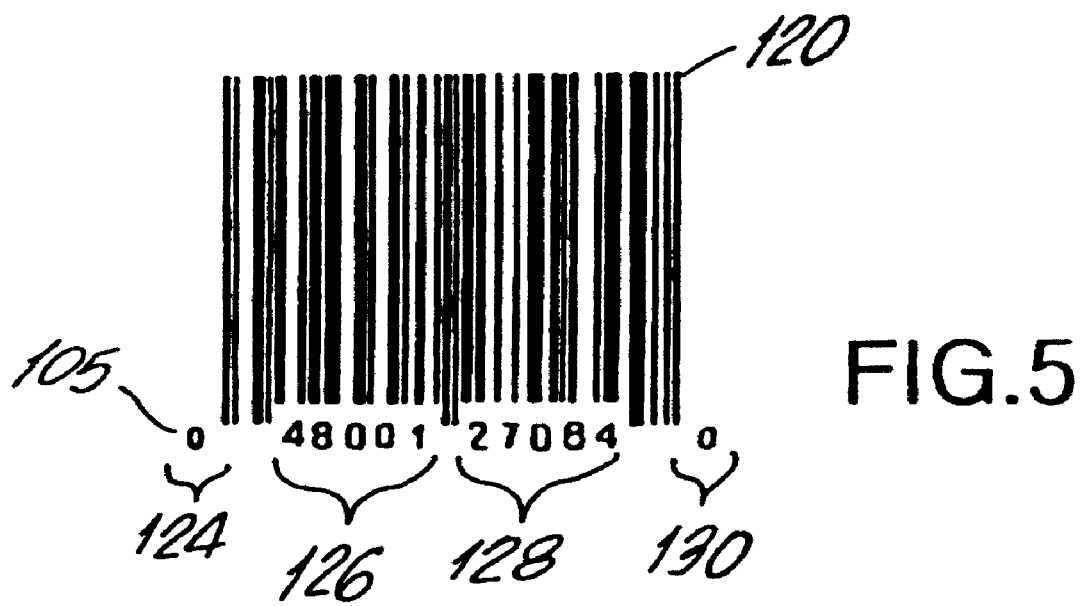
FIG. 5 is an example of a prior art UPC bar code that is compatible with the present system.

The five-digit Manufacturer Number 126 identifies the specific manufacturer who "owns" this series of UPC codes. The Uniform Code Council assigns Manufacturer Numbers. A particular manufacturer may "own" multiple Manufacturer Numbers, whether by design or by acquisition. The five-digit Item Number 128 identifies the specific item within a particular manufacturer's product line. Each individual manufacturer assigns his or her own five-digit Item Numbers 128. The single checksum digit 130 completes the UPC bar code. All twelve digits are printed below each UPC code as shown in FIG. 5.

Figure 6:
FIG. 6 is a shortened bar code symbol that is compatible with the present system.

A "Zero Suppressed" form of UPC ("UPC-E") is also available (see FIG. 6). This results in a more compact representation, but has a more limited number of Item Numbers, and is only available to manufacturers with Number Series "0" codes, although codes have been found that appear to violate this. The UCC specification for UPC provides the algorithm for translating from UPC-E to the equivalent UPC-A. This form looks like that shown in FIG. 6.

The linkage system of the present invention treats the combination of the one-digit Number Series 124 and Manufacturer Number 126 as functionally equivalent to the SID 110 of the linkage code 104, and the Item Number 128 as functionally equivalent to the IID 112 of the linkage code.

EAN, which is similar, has some minor differences, the most notable being that it has country code, manufacturer code and item code, and the boundaries vary from country to country.

The present invention supports the use of vanity codes 103. A vanity code is a string of characters intended to be a more meaningful replacement for the human-readable digits in a bar code symbol and is analogous to a vanity license plate on a car. Supported vanity codes are processed in a manner similar to bar codes and will be described later in this specification.

It is worth noting that bar code scanners vary as to whether or not they transmit the checksum digit. Frequently, this is a configurable option. The linkage client 22 handles either case.

Bar Code Type Recognition

The linkage client has a recognition phase that is employed when a bar code scanner is used, such that the scanner can determine the symbology (Code 128 or UPC) of the bar code. If it is properly configured, the bar code scanner may send a header along with the bar code data indicating the symbology. This allows the client to determine whether a particular bar code is a native linkage code 104 (Code 128) or a UPC code 105. Some bar code scanners do not send a symbology identifier. In addition, no such identifier is available when the user types a digit string 106. As a result, the following algorithm is used to guess the symbology based on the input string of the linkage code alone:

1) When a user enters a UPC code 105, the check digit must be included. Thus, valid typed-in UPC codes 105 are either 12 (see FIG. 5) or 8 digits in length (see FIG. 6). The UPC checksum test is applied to any 8 or 12 digit code. If it passes, the code is assumed to be a UPC code. Linkage codes that happen to be 8 or 12 digits in length are specifically designed to fail the UPC code check digit test.

2) Linkage codes are always an even number of digits in length. Thus, if a 7 or 11-digit linkage code is received from a bar code scanner, it is assumed to be a UPC code that is missing its check digit.

3) A linkage code that has not yet been identified as a UPC code is subjected to the linkage checksum test. If it passes, it is assumed to be a linkage code. If it fails this test the linkage code is rejected as invalid and an error message displayed.

If a symbology is returned as part of a bar code scan, the linkage code is still validated. Thus, even if a "Code 128" bar code is scanned, if it does not pass the checksum test, the linkage code is rejected. Similarly, if a UPC code is scanned and the scanner returns the check digit the check digit test is applied before the linkage code is accepted.

Note that the European EAN codes are similar to UPC codes, but have an extra digit (12 digits plus a check digit). It may be necessary to require EAN bar code scanners to return the check digit. Failing this, there is the possibility that an EAN code without check digit could be mistaken as a UPC code or a linkage code. Alternatively, the EAN codes may be analyzed through a secondary process if a first match at the routing server indicates that the code is not found. For example, the system may request that the user identify some other known criteria of the item such as country of purchase. The system may optionally look at the demographics of the user to help identify unrecognizable symbols or to assist in the recognition of EAN coded products.

An alternative embodiment of the linkage system directly encodes the IP address of the information server in the linkage code, but this may not be desirable in most cases since changes in the IP address of the information server will require costly changes in the packaging of products identified as such. The preferred embodiment uses the aforementioned SID code and IID code which has several advantages over the direct encoding method. The first advantage is related to the fact that direct encoded codes could be very long. Even compressing the 32-bit IP address into a binary number requires 10 digits. This means that the minimum length code that may be generated for the direct encoding is 13 digits. The second advantage of using the SID and IID codes is related to the potential impact upon a change in either the IP address or the URL of the destination for the web server. The linkage codes could potentially be rendered obsolete or require translation since the destination would not exist or might be reallocated to a different user of the address. The third advantage of using SID and IID codes is related to the transitioning from 32-bit IP addresses to much larger ones (IPv6). The longer addresses would similarly require longer linkage codes when the larger IP addresses are embedded in the bar code making it much more difficult to support with scanning hardware.

As a result, the linkage system of the present invention is preferred by using SID codes, rather than direct IP addresses. The routing server translates these SID codes into Domain Name Service (DNS) names for web servers. This allows the standard underlying name-to-IP address translation servers to be used by the web browser, preserving future compatibility.

Another limitation of the direct-encoding system was that the information server 50 had to be in one of a few, fixed places in order for the URL to be properly generated. This was found to be restrictive. As a result, the routing server 40 returns not just the name of the content server 60, but a full URL to the information server 50 CGI. This allows the information provider complete flexibility as to where the information server 50 is installed.

Finally, it was recognized that, over time, the capabilities of the information server 50 would change, and, as a result different versions of the information server 50 might want different query formats, or require different information. As a result rather than having the client "free-format" enter the data portion of the CGI URL, the routing server 40 returns a template 46 to the linkage client 22. This template is a fully-formatted URL, except that items that the client or the linkage client 22 are to fill in are indicated with placeholders. This allows the routing server 40 to initially determine the particular information server 50 that is to be communicated with by including it in the template 46. The template 46 is then completed by the client or linkage client to populate the other parameters required by the template for any type of linkage code received.

The linkage client 22 caches templates returned from the routing server 40 in a cache memory 27. This reduces the load on the routing server 40, as well as reducing the amount of time required to retrieve the web content. When the routing server 40 returns a template 46 to the client, an associated expiration date is returned as well. The linkage client 22 saves both. If another linkage code with the same SID 110 is input before this expiration date, the cached template 27 is used.

After the expiration date, the client repeats the template retrieval process by contacting the routing server 40. This allows the location of a particular information server 50 to be changed, given sufficient advance notice. In addition, a protocol is implemented between the client and the Routing server whereby the routing server can immediately expire any particular template during the course of any other transaction with the client.

User Registration Process

Figure 7:
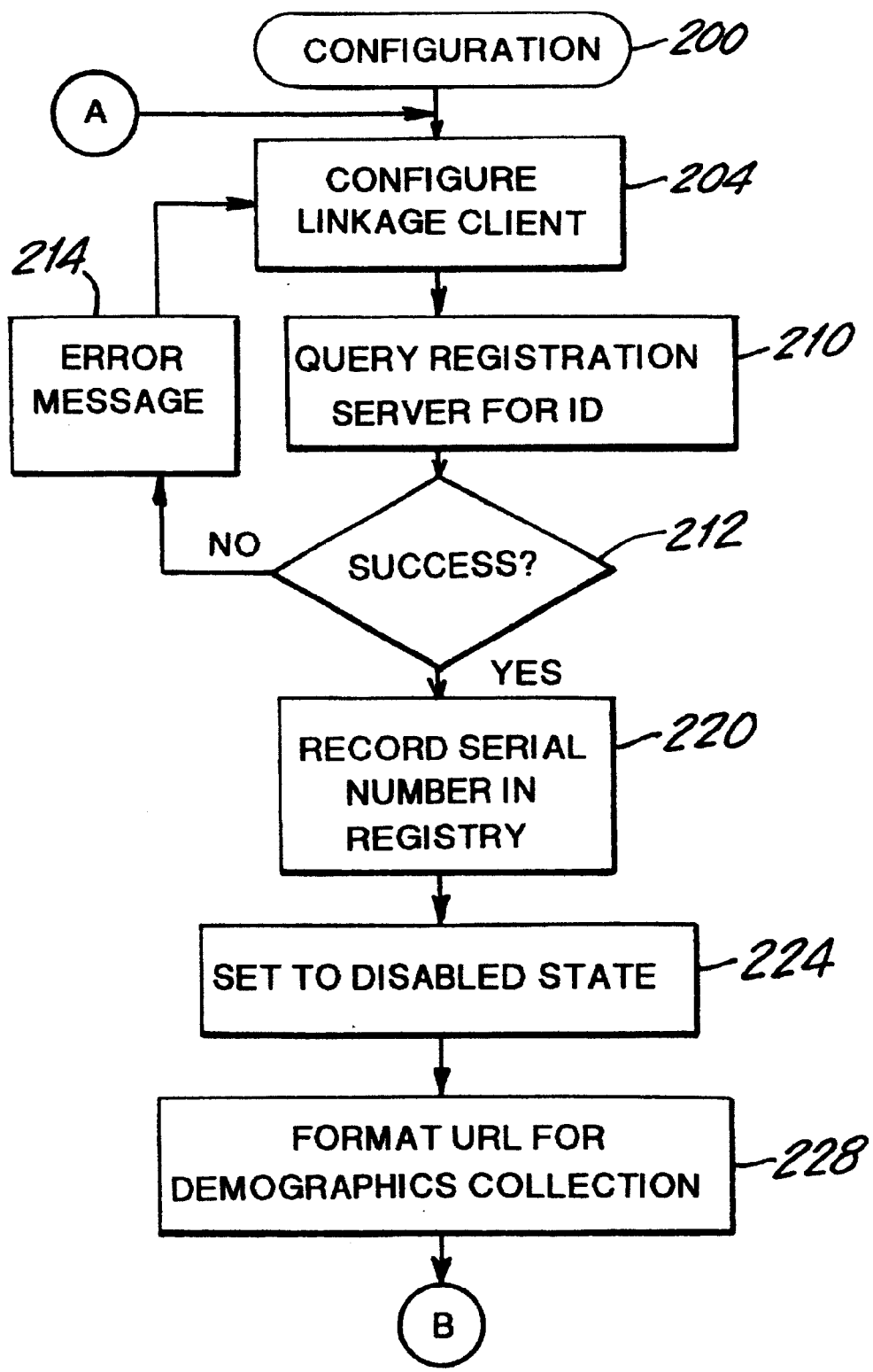
FIG. 7 is a process diagram of the configuration process for the client interface.

The following section describes the sequence of operations required to enable a client computer 20 to function in cooperation with the linkage system of the present invention (see FIG. 7), with respect to a Windows-based operating system (the present invention is of course not limited to operation in Windows systems and may be used in conjunction with other platforms). After the linkage client 22 is installed in the client computer, it will be executed for the first time. During the initial execution, there will be no user ID stored in the Windows Registry. This tells the linkage client 22 that it is not yet registered with the registration server 50. Under this circumstance, the linkage client 22 prompts the user to enter configuration information at step 204 and then requests permission to register. If the user declines permission, the client exits.

The next step is for the linkage client 22 to establish a user ID. A file installed with the client provides the URL template (file request word) for the registration server 30. Using this template, the client makes a "new" query to the registration server 30 at step 210. This is done as a standard HTTP query for compatibility with proxy servers, and is made directly from the client to the registration server 30. The registration server 30 responds to this query by issuing the next sequential User Identification code and returning it to the client. It also creates a new blank record in the User Database 32 with this user ID, flagging this record as "new". The client saves the returned user ID in the registry at step 220, and sets its own state (in the registry as well) to "registration not confirmed". The response from the registration server 30 also includes storing on the client computer 20 an updated registration server URL template, as well as the URL template for the routing server at step 228. A separate user identification data element may be recorded as part of the demographic data collection process. This identifier would be known to the user and would alternatively be supplied to destination web servers when required as part of the template parameters.

Figure 8:
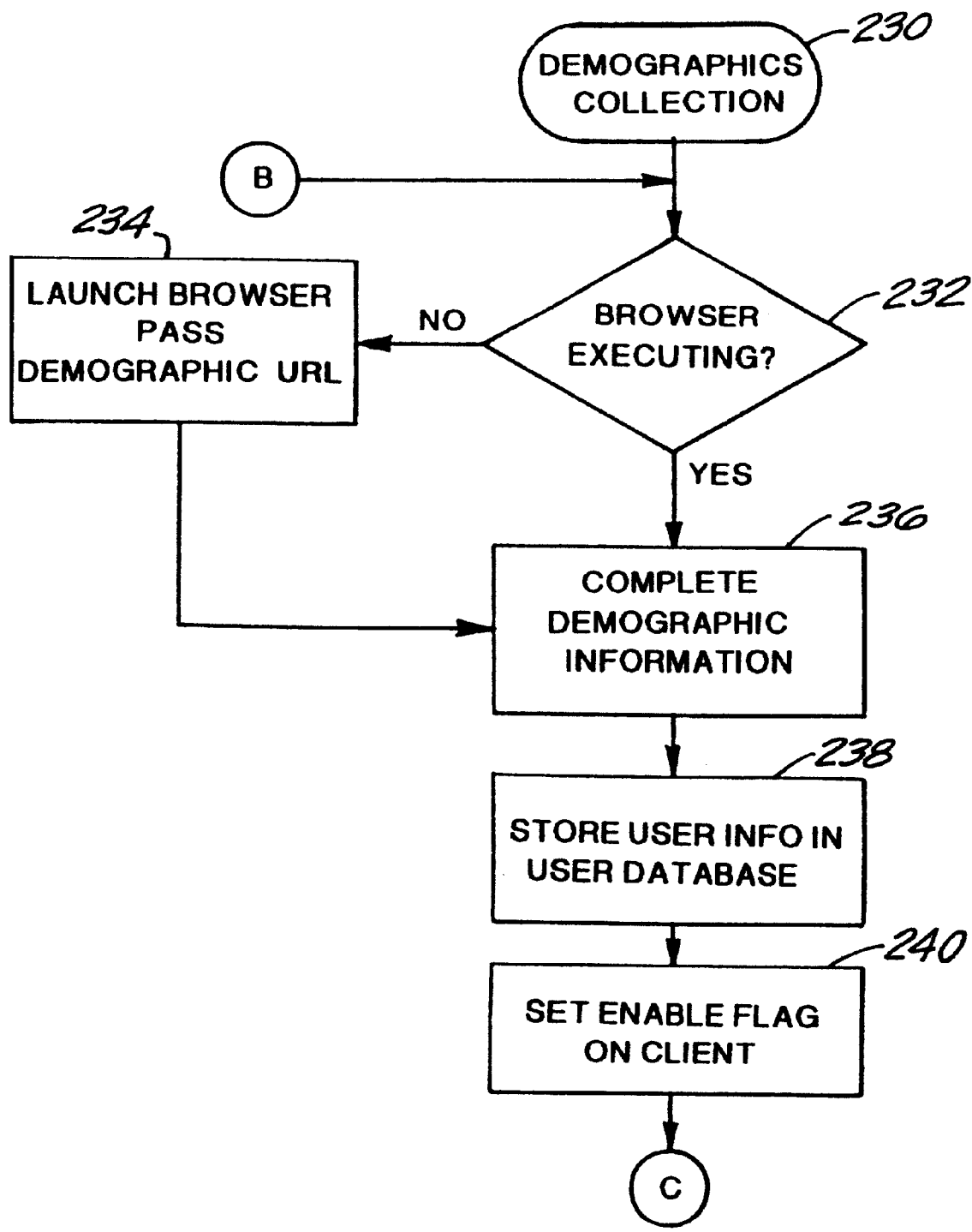
FIG. 8 is a process diagram for the identification of demographic data.

While it is possible to include the functionality of the linkage client into a software add-in module that is directly integrated with a web browser such that the address line input may be interpreted as a linkage code, this process for explanation purposes is described as if the linkage client is a separately executing software client. The next step is to present the user with the registration server 30 registration form to collect demographic data, as shown in FIG. 8. A check is performed to determine whether the web browser 24 is running at step 232. The web browser 24 is started at step 234 and the URL is called to display the demographic collection form to the client at step 236. The client uses the registration server URL template to format a "get" query to the registration server 30. This query includes the user ID, allowing the registration server to know which user is filling out the form. This query is sent to the user's web browser, resulting in the registration form being displayed.

At this point, the user fills out the form and submits it. If the form is properly filled out, the registration server stores the information at step 238, and updates the state of the user's record to "active" at step 240. Note that this transition is not directly visible to the client, which is still in the "registration not confirmed" state. If the form is not properly filled, out, the form is re-displayed to the user with an indication of the error or omission, and the state of the user's record is not altered.

Entry of Linkage Codes

The end of the registration process provides the user with a linkage code that may be entered into the user interface to test the functionality of the system. The entry of a linkage code will be described with regard to FIG. 9. Whether the user inputs the supplied linkage code or another one at step 252 by entering it into the input field 502 via the supplied user interface 500 (see FIG. 14), the registry is checked to assure that it is properly configured at step 254. The first time the user attempts to input a native linkage code into the input field 502, the linkage client notes that it is still in the "registration not confirmed" state at step 260. As a result, its first reaction is to perform a "status" query to the registration server 30 at step 262. A check is performed at step 264 to see if the user has properly filled out his or her form. The registration server 30 returns an "enable" command to the client that causes the client to change its state to "enabled," and to continue to process the code as described in the next section.

If the user has not properly filled out his or her registration form, the registration server 30 returns a "disable" command to the client. This causes the client to change its state to "disabled." Part of the response also contains a redirect URL at step 266. This URL is sent to the user's browser. The net effect is to present the user with the form again, since the "required URL" is the same "get" query used above. The system also contains provisions whereby a registration server administrator may manually disable a particular user. This might be done if it were determined that the user had entered information that, while sufficient to pass the automated validation tests, was clearly inaccurate, offensive, etc.

During subsequent use of the linkage client 22, when the linkage code is entered, the client checks its state. The possible states are "registration not confirmed," "enabled," "enabled but overdue," and "disabled." "Registration not confirmed" was covered in the previous section. When the registration server enables a linkage client 22 it includes a parameter for its lifespan preferably as a duration in days. Once this period has expired, the client considers itself to be in the "enabled but overdue" state. The "disabled" state is only entered on specific command of the registration server 30.

If the state is "enabled," processing proceeds, If the state is "enabled but overdue," or "disabled," the client automatically issues a status query to the registration server before continuing with code processing. If the response to this query includes an enable command, the client state is changed to "enabled," and processing proceeds. If the response indicates that the client should be disabled, the "required URL" from the response is sent to the browser, as in the previous section. If the status query fails (i.e. unable to communicate with the registration server 30), and the client was disabled, an error message is displayed and the client remains disabled. If the client was "enabled but overdue," however, the status query failure is silently ignored. This is done to prevent users who had properly registered from being disrupted by the registration server going offline. (The "disabled" state is only entered on specific command from the registration server.)

The client then proceeds to decode the linkage code to obtain the SID and IID at step 270. If the code is not validated as part of this decode at step 272, an appropriate error is displayed at step 274.

The client examines its template cache 27 at step 280 to determine if it has an unexpired template for this SID. If so, a full URL is formatted using this template and sent to the browser 24. If the client does not have an unexpired template for this SID, it uses the locally stored routing server URL template to format a query at step 296.

Figure 9:
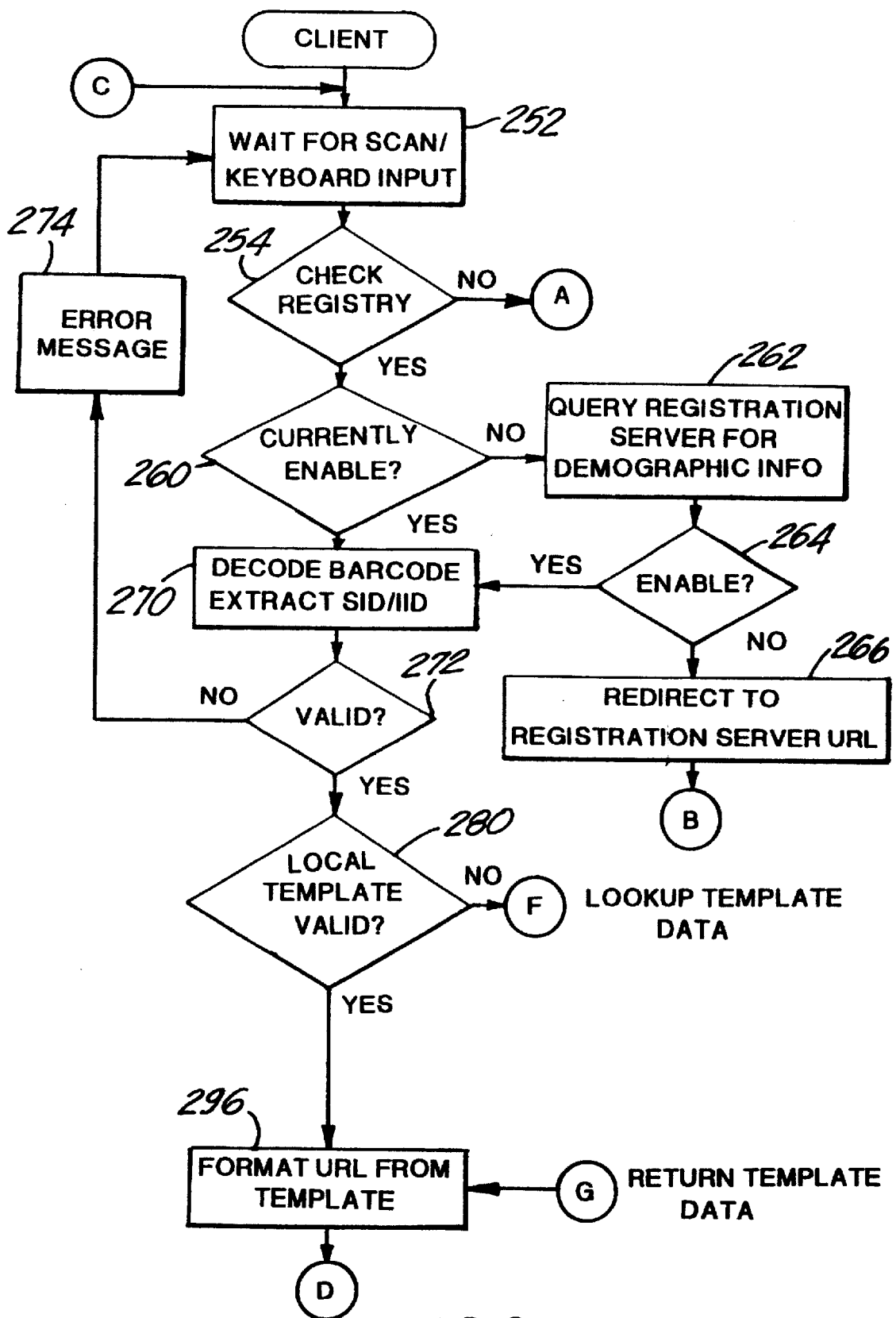
FIG. 9 is a process flow diagram for the processing that occurs when a linkage code is entered into the user interface.
Figure 10:
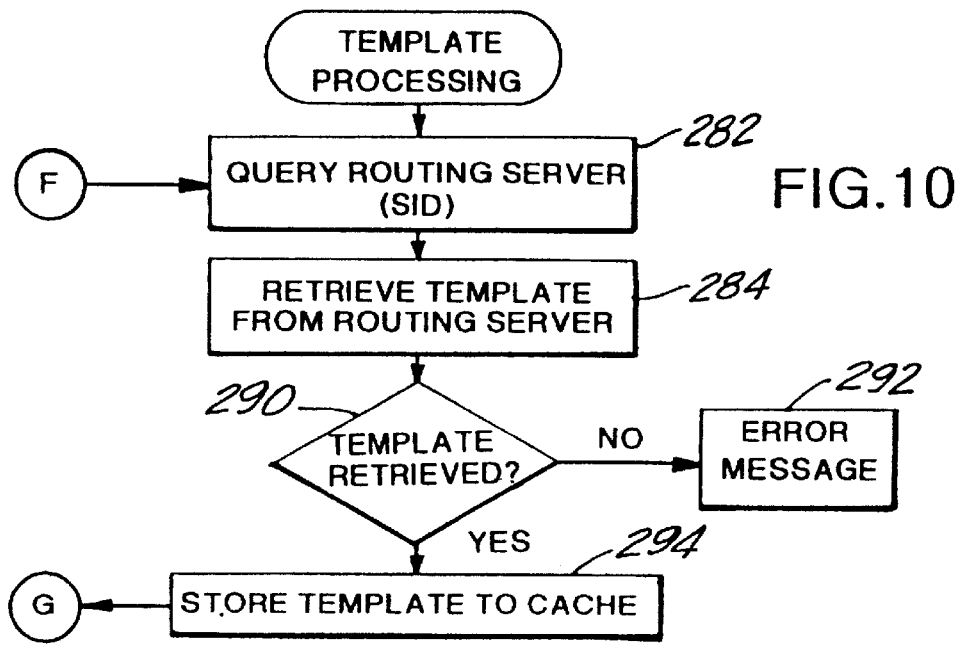
FIG. 10 is a process diagram of the subset of the template processing steps performed in an embodiment of the present invention without demographic processing.
Figure 11:
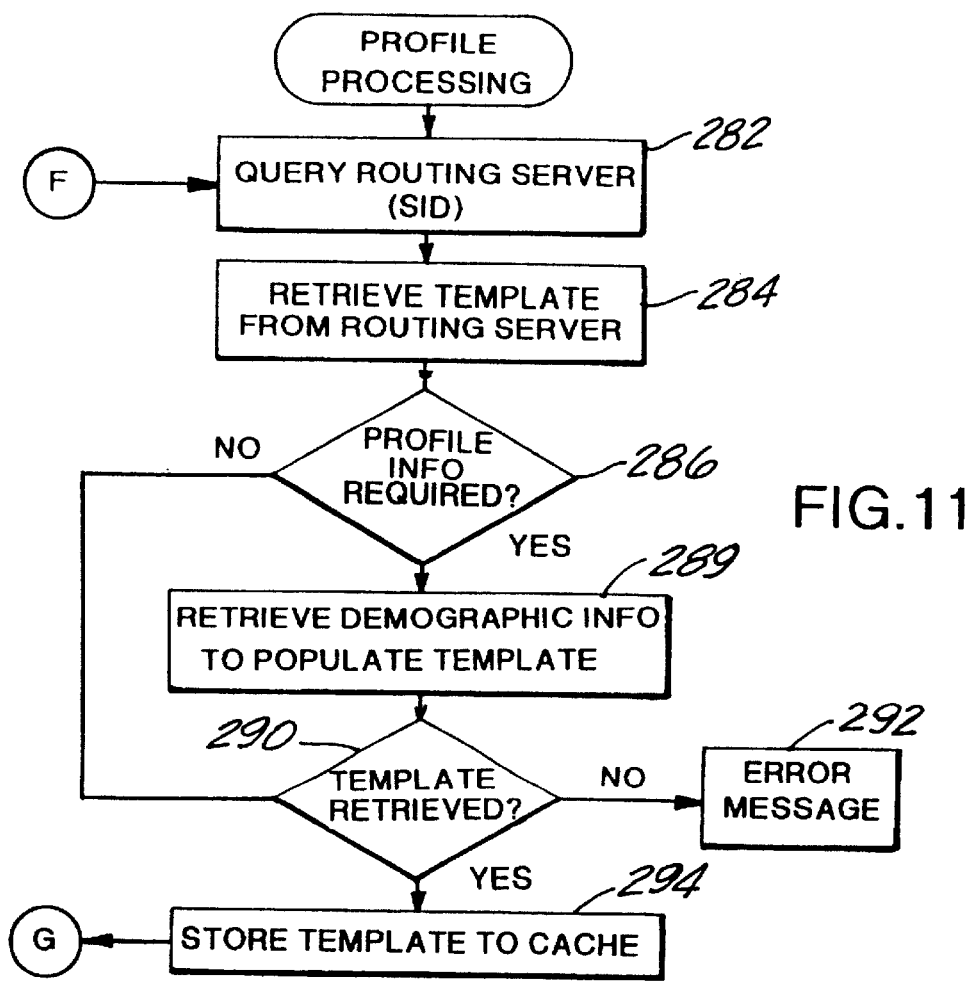
FIG. 11 is a process diagram of the subset of the template processing steps performed in an embodiment of the present invention with demographic processing.

If the template stored in the cache 27 has expired, or if the cache does not contain a template of any type for the SID that was entered, the linkage client 22 automatically attempts to retrieve a new URL template as indicated by process step "F" in FIG. 9. In one embodiment, (as shown in FIG. 11), a query is directed to the routing server 40 using the SID at step 282. The response to this query at step 284 will normally include the current URL template for the SID and the new expiration date. If a URL template is not received, or an error occurs during the query to the routing server 40, an error message is displayed at step 292.

In another embodiment as shown in FIG. 11, following the query of step 282, and the retrieval from memory at step 284, the template is analyzed to determine whether information from the user profile on the registration server 30 (or other extended information) is required at step 286, from either the client computer 20 directly or via a communication link established to the registration server 30. The data matching the template is retrieved at step 289 and the template along with the user profile information are returned to the linkage client 22 at step 290. This revised template is stored in the cache at step 294.

Figure 12:
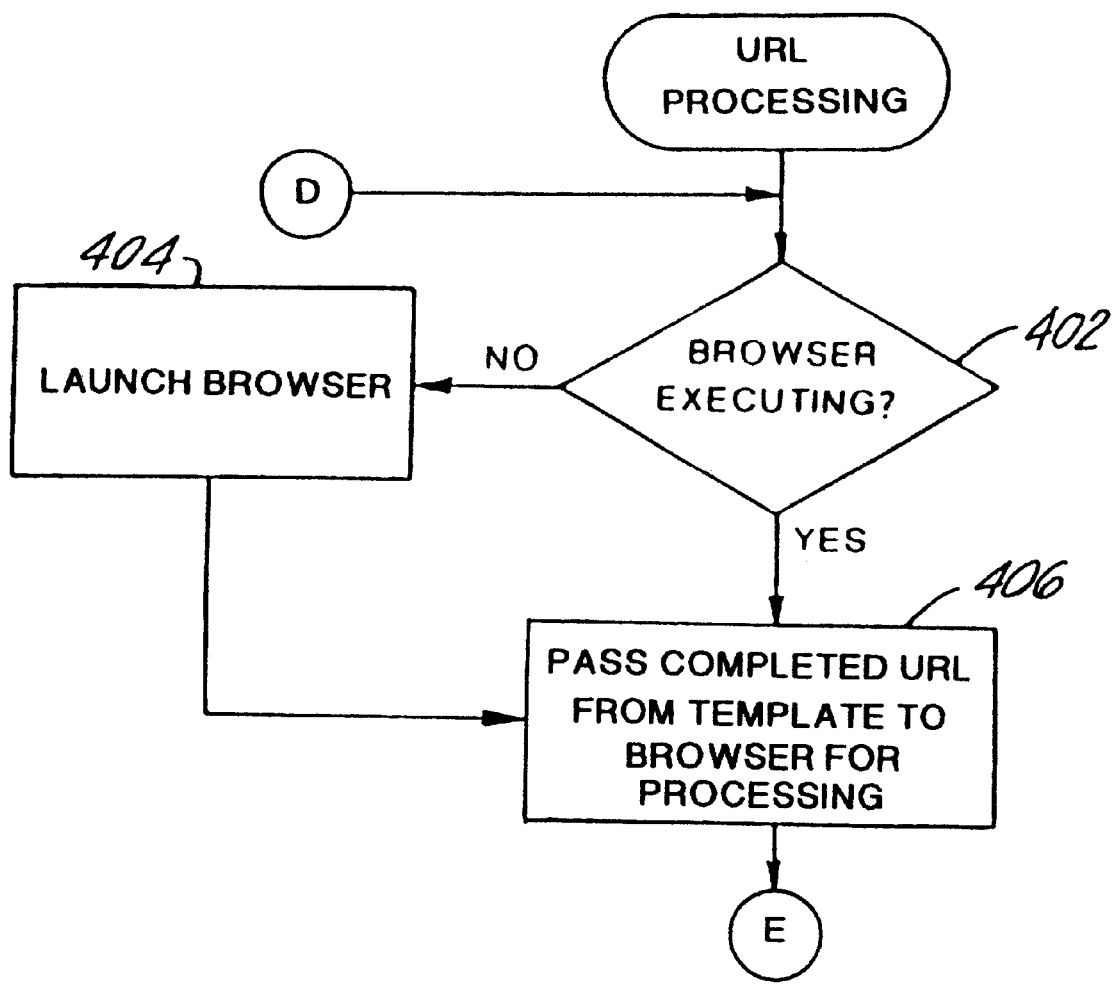
FIG. 12 is a process diagram of the URL processing of the present invention.

At the linkage client 22, the IID is now inserted into the URL template along with the other parameters required by the template, which are also substituted into the corresponding placeholders of the template. The completed template is now in the form of a URL. The web browser 24 must be executing to successfully process the URL at step 402 (see FIG. 12). If the web browser is not executing at step 402, the web browser is started at step 404 and the URL is sent to the web browser for execution at step 406. A special protocol may be employed to pass the URL to the browser such as provided by Spyglass with DDE protocol as well known in the art.

Figure 13:
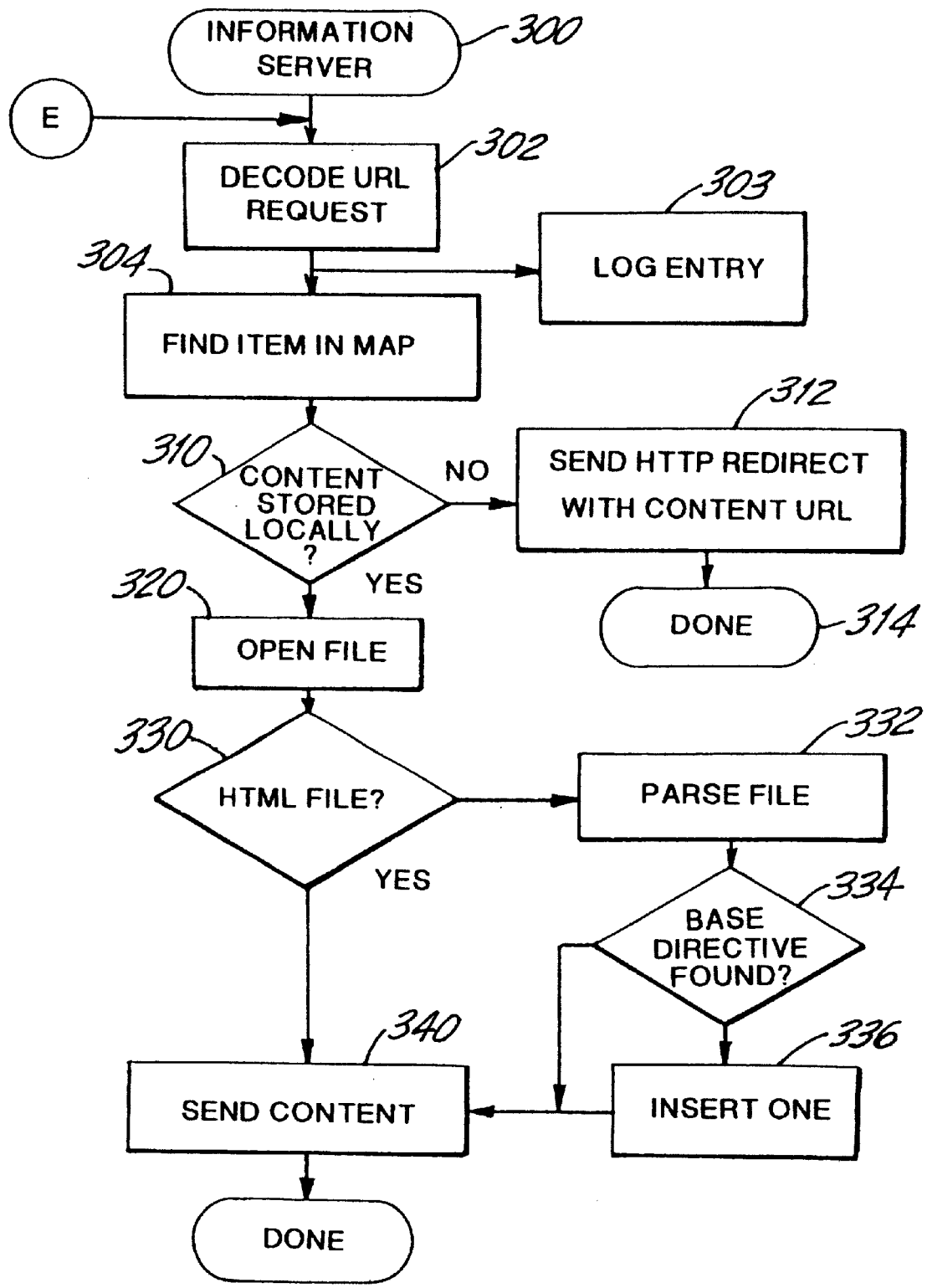
FIG. 13 is process diagram of the processes performed at the information server to lookup the destination address corresponding to the received template.

The URL sent from the linkage client to the web browser 24 will usually be a reference to an information server 50 CGI. The URL will contain the client's user ID and the IID from the linkage code and any other template specified parameters. The URL request containing the CGI is received at the information server 50 where the URL is decoded at step 302 (see FIG. 13). The CGI, when invoked, will extract the decoded values, make a log entry into the hit log database 54 listing the date, time, User's ID and IID, at step 303 and then will look up the IID in its mapping database 52 to determine the corresponding web page at step 304. Attributes may be assigned to the individual log entries to facilitate various pricing models or to determine usage. For example, the log references may be color coded to visually give the reviewer an indication as to the frequency of types of queries processed. Alternatively statistics may be compiled to facilitate the cost allocation to the various clients of the system where the attributes for the detailed levels of routing utilized for that transaction request are recorded or monitored and compared to a pricing structure stored in the information server and, or at the routing server.

Once the web page is determined, the information server will respond in one of two ways based on the type of content mapped. In response to an HTTP query for local content at step 310, the information server 50 can directly return the web page. This approach has the advantage of being efficient, but introduces issues with respect to how the web page is written, since the browser will interpret "relative URL's" with respect to the URL created based on the template. This can be easily overcome by ensuring that the data returned contains only "absolute" or "fully-qualified" URL's. Alternatively, the preferred method is to respond to the URL with an HTTP "Redirect" status response at step 312. This response informs the browser that the requested item has been "moved temporarily," and provides the updated URL to a content server 60. The browser responds to this status return by generating a second query to the content server 60 specified in the URL. This method suffers the overhead of a second query, but eliminates problems with the web content. If the information server 50 retrieves another template instead of a redirected URL, this template may be completed at the information server 50 with information looked up from the mapping database, the registration database, or parameters received from the user in the form of parameters of the original URL.

Profile Routing

In the profile-based processing that was previously described with respect to FIG. 11, the URL template provided by the routing server 40 additionally specifies that demographic information is required in order to determine how the template and CGI are to be processed. There are two types of demographic fields that can be used for profile routing. The first is a "direct" demographic field that can be used directly from the values entered in the registration database. The second type is a "synthetic" demographic that is constructed from the registration information based on customer requirements. A synthetic demographic like "Region" may be constructed from a list of zip-code ranges that divide the country into quadrants. Synthetic demographics will likely be custom built since each customer's definition of "region" will be different.

The demographic fields will be inserted into the URL template at the routing server 40. It is enabled by adding demographic field macros to the template. Direct demographics for example may refer to: D1—Gender, D2—Language, D3—Age (Current year–Birth year). To hide the demographics fields in the URL we will code them as D1,D2,D3, . . . Dn. This both obscures the fields in the URL (in case it is displayed in the address box) and it shortens the length of the URL. Other demographic data may refer to the user's Industry, Job, and Title. Synthetic demographics are derived to generate another discretionary field that may be used to limit or restrict or direct the user to specific web destinations. Region information for example is one type of synthetic categorization that may be used. Third party companies may additionally define constraints that are used to select the mapped content for the user.

Client macros to be substituted for demographics in the template are enclosed in "^" caret marks. This type of macro is identified in the template may be resolved in part by the routing server. The system generally uses carets to indicate places that the client will do substitution, and asterisks to indicate places that the routing server will do substitution. This eliminates any conflict between the two.

For example, in response to a request from a linkage client 22 for a URL template related to a product with a SID code of '20', the routing server would select a URL template corresponding to the company "Neomedia" which would be sent to the client in the form below:

TABLE 1

Information server Name: NeoMedia Technologies
SID: 20
Template: http://www.neom.com/NeoLink/Scripts/nlserver.exe?
Parameters: SID=^SID^&TYPE=NEO&IID=^IID^&USER=^USER^

A template that requires demographic information would have secondary parameters that will be used in server macros that are processed at the information server 50. The parameters indicated by "*" asterisk in the template string below indicate the presence of server macros embedded in the template for demographic information.

http://www.neom.com/NeoLink/Scripts/nlserver.exe?SID=
    ^SID^&TYPE=NEO&IID=^IID^&USER=^USER^&D1=
    *D1*&D2=*D2*&D3=*D3*

An unknown macro will be replaced with an empty string. If the demographic field was "Not Provided" when the user registered, then the field will be empty in the URL. In this example D1, the gender, was not provided so it is empty.

nlserver.exe?SID=10&TYPE=NEO&IID=1&USER=123&D1=
    &D2=01&D3=24

In one embodiment, the processing of demographic field macros needs to be hardcoded into the routing server 40. This means that adding new fields requires coding changes to the routing server to perform the processing required. In another embodiment, the demographic field processing routines are stored in a separate DLL so that this part of the routing server can be updated independently by replacing the DLL.

The information server (nlserver) will have to be able to check if a code has profiled routing rules associated with it then evaluate the rules based on the demographics variables. It will return the map associated with the first rule that matches or the default map if no rules match. It will log audit information based on what rule was matched.

Figures 14, 15:
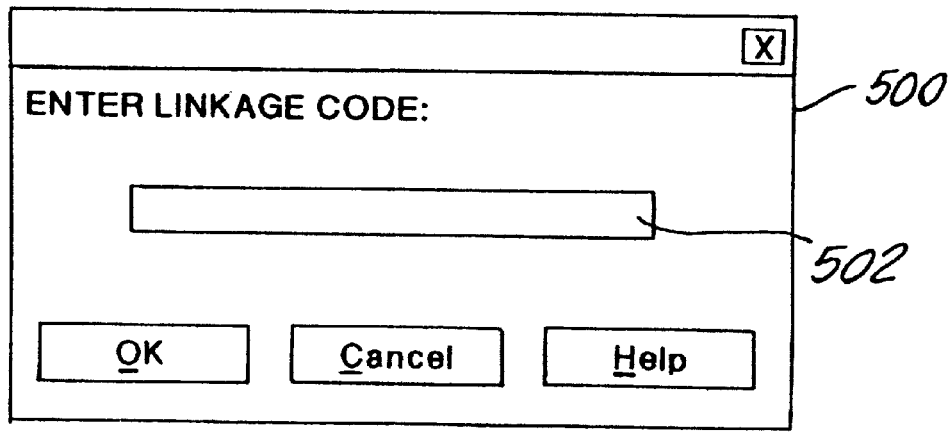
FIG. 14 is a representation of the user interface for inputting linkage code digit strings.
FIG. 15 is a sample table that maps rules, and URLs to linkage codes and vanity codes.

The mapping database 52 will need to logically maintain multiple mappings for linkage codes with profiled routing. Each profile routed map will have a rule and a rule order such as shown in FIG. 15. The mapping database of the preferred embodiment shows the relationship between the SID 550, TYPE 554, IID 556, ORDER (rules) 558, VSID 560, VIID 562, RULE 564, and MAP 566. These record elements are compared to the template received to determine the destination URL contained in the mapped item that is passed back to the user's web browser 24 by the information server 50. The information server 50 processes rules stored in a rule database to compare the content requested to the demographic data retrieved by the routing server for a particular user. In the preferred embodiment, the "rules maintenance" and the "linkage code maintenance" forms are used to manage the these values and allow a code to have multiple mappings based on rules (see FIG. 17.

The presence of configuration files on the routing server for a particular SID information server (rules.cfg and demographics.cfg) indicates that profiled routing is or is not enabled for that information server. The parameters stored in the configuration files identify the specific parameters that need to be acquired from either the registration server or from user configuration files stored on the client computer.

[Server-20]

. . .

RulesFile=rules.cfg
DemographicsFile=demographics.cfg

An import program (nlimport) is supported to permit the batch load of rules and mappings into the rule and mapping databases. An export functionality also permits these export of mappings into various formatted output.

Defining demographic fields for the Information server may be done through a configuration file. The fields must match the corresponding linkage codes used by the Routing server. Custom demographics configuration files would be set up for the information server when they are set up for the Routing server. There are currently two types of linkage codes, a "number" which is an integer that can have any value, or a "code" that is an enumerated list of possible linkage codes. Linkage codes do not have to be numbers.

A sample demographics.cfg configuration file to define demographic fields is provided below:

[D1]

name=GENDER
description=User's gender
type=code

[D1-CODES]
0=Male
1=Female

[D2]

name=LANG description=Preferred language type=code

[D2-CODES]

00=English

01=French

02=Spanish

03=Italian

04=German

[D3]

name=AGE description=User's age type=number

The enumerated list of language codes (D2) is used by the administration program to create the pull-down selection boxes on the page to define simple rules.

The information server administrator would be responsible for defining the rules used for profiled routing. There are two types of rules, simple rules and compound rules. Simple rules implement the logical AND between fields, and compound rules implement the logical OR between two or more simple rules. Simple rules are constructed from the list of demographic fields available. A user interface is provided in the system to permit either the administrator or the primary web server content provider to create and manage rules associated with the destination mappings that are supported at the primary content web server. A rule for Spanish Women is shown in the sample interface of FIG. 16.

An example simple rule:

| Name | "Young French Men" |
|---|---|
| Rule | 1 (number is auto assigned) |
| Condition-1 | AGE is between 14 and 24 |
| Condition-2 | LANG is French |
| Condition-3 | GENDER is Male |

All conditions in a simple rule must match for the rule to be considered a match. Thus, this type of rule implements a Boolean "AND" operation on it subcomponents. There are two types of conditions depending on the type of the field in the condition. Number type fields (e.g. AGE) match a range of values specified by a low-value and a high-value. Code type fields (e.g. LANG) match a single specified value. There can be as many conditions as there are demographic fields. A rule can consist of one or more field conditions. The conditions are each checked, if one condition fails then the rule does not match. If a field parameter is not part of the URL template then a rule that uses that field will never match. This will only happen if the routing server is out-of-sync with the information server's configuration file. If a field parameter is empty it will only match the "Not Provided" condition. If a field parameter contains a value that is not in the information servers configuration file then it will simply not match.

Compound rules are constructed from simple rules. An example compound rule:

| Name | "German & French Women" |
|---|---|
| Rule | 2 (auto assigned) |
| Condition-1 | French Women |
| Condition-2 | German Women |

This compound rule depends on the two simple rules "French Women" and "German Women". A compound rule consists of a selection of the simple rules. If any of the simple rules match then the compound rule matches (see FIG. 18). Thus, this type of rule implements a Boolean "OR" operation on its subcomponents. It is well known that the combination of the Boolean "AND" and "OR" operations is sufficient to express any arbitrarily-complex Boolean relationship. Thus, with a combination of simple and compound rules, any desired combination of the available variables may be constructed.

There can be as many conditions as there are simple rules defined. The conditions are each checked, if one condition matches then the rule matches. Once a rule has been defined, the rule may be applied against any mapping that is recorded in the mapping database 52. For example, if the user enters the linkage code for Coke by either entering a bar code that decodes to a SID 550 of '10' and the IID 556 of 11 (as shown in FIG. 15) or by typing the vanity code "Coke—TryIt", which is a vanity server ID "Coke" and a vanity item ID "TryIt", the demographic rules shown in FIG. 15 would be applied to determine which mapping to return to the user. FIG. 18 shows another representation of the linkage code mapping database where the administration interface 600 is provided.

As may be seen from the above, the system is designed so that the client will periodically make status requests of the registration server 30 over time. This allows the registration server 30 to disable a user who is found to have entered invalid information into the registration form. An additional capability is built into the client-demographic server protocol. A successful status query (i.e. one that enables the client or extends the enable period of the client) may include an "optional URL". If the client receives this, it prompts the user, asking permission to send the user to this URL instead of the one associated with the linkage code that was input. The specific question to be asked is part of the message from the registration server 30 to the client, as is the specific URL. This technique offers the system administrator the opportunity to request that the user review his or her demographic information, update their client, etc. over time. When this request is presented, the URL and the question are all under the control of the registration server 30.

Similarly, a successful status query may return a "required URL" in much the same manner as a status query that results in the client becoming disabled. In this case, the URL received from the registration server 30 is always sent to the browser instead of the one associated with the linkage code input by the user. This offers a way of forcing a user to see certain information, should it be sufficiently important.

Linkage Code Blinding

Both linkage codes and user ID's are blinded before being issued or displayed. The "blinding" operation is a form of obfuscation and/or encryption. In the case of linkage codes, blinding is intended to make it difficult for someone to build their own codes without using licensed software. In the case of user ID's, blinding is used for revenue protection. The business model for linkage includes the fact that the user demographics are valuable data, for which the system administrator may plan to charge. If user ID's were sent "in clear," the operator of an information server would only need to pay once for a user's information linked to the user ID. Worse, once this information was sold, there would be nothing to prevent the recipient from passing it on to someone else, thus depriving the system administrator of revenue opportunity.

As a result, each time a URL is generated, the user ID that is part of the URL is scrambled in a different manner. This is achieved by encrypting the "true" UserID with a random number. The random number is then appended to the code, and the resulting digit block sent as the "blinded" user ID. Given that the algorithm for performing this remains confidential to the system administrator, there is little chance of an external party reversing this operation. As such, even if a particular user "hits" a single site several times, there will be no direct way for the information server 50 operator to determine which of the log entries are from a particular user.

Redirection vs. Direct Web Page Returns

As indicated previously, the preferred method for providing access to web pages via the information server 50 is via HTTP redirection. Web pages are typically designed to contain embedded images. The HTML language used to write web pages embeds images by including a construct that says, in effect, "an image goes here and here's where to find it." The issue is that the URLs used to specify images are typically not fully qualified URLs. Rather, they are frequently expressed relative to the URL of the page that contains them. This makes maintenance on the part of the web master substantially easier.

Consider a web page whose URL is:

http://server.com/directory/page.html.

If this HTML file contains two images, one listed as "imagel.gif" and the second listed as "test/image2.gif", the web browser will retrieve the images using the URLs http://server.com/directory/image1.gif and http://server.com/directory/test/image2.gif respectively.

Suppose, now, that the information server 50 maps this web page to IID 3. The URL that would be sent by the client into the browser would probably look something like http://server.com/cgi-bin/wdserver.exe?A=2.1&B=3&C=918273645102

If the server sent back the contents of "page.htm" in response to this query, the web browser would attempt to retrieve the images using the URLs http://server.com/cgi-bin/imagel.gif and http://server.com/cgi-bin/test/image2.gif respectively. This is almost certainly wrong. Similar problems occur when the page contains hyperlinks to locations within the page itself. HTTP redirection solves this by having the browser use the correct URL to obtain the page.

One disadvantage of HTTP redirection is that it requires the page that is eventually displayed to have a value Internet URL. This means that the page can be bookmarked, and returned to directly, rather than requiring access to be made though the information server. Pages returned directly, on the other hand, could be read from directories outside of the standard web root or from directories that the web server is not aware of. Thus, direct return has advantages in certain circumstances. The information server does, in fact, support both means of access. When a page is directly returned, however, the following rules must be observed. All hyperlinks should be fully qualified. All image references should he fully qualified, or the HTML file must have a BASE tag in the header that will result in valid URLs when the relative URL generation process is performed by the browser.

As mentioned above, a "vanity code" is a mnemonic textual string that could replace the digit string normally printed with a linkage code type bar code. Thus, rather than printing "762–867" under the bar code for the Acme Company web page, one might print "AcmeCo".

The implementation of "vanity codes" for the linkage system operates as follows:

1. The linkage client assumes that anything typed in which is not solely composed of digits and dashes is a vanity code.
2. On recognizing a vanity code, the linkage client converts all the letters in the vanity code to lower case, and removes all spaces. This forms the "key" for the vanity code. This is done to eliminate case sensitivity issues, as well as issues relating to multiple embedded spaces.
3. The linkage client then examines the vanity code to locate the first non-alphanumeric character in the code. The portion of the code to the left of this point is used in the same manner as the SID for a numeric code, and the portion of the code to the right is used as the IID. Thus, in the code "NEOM*Today&Forever", "NEOM" is the SID and "Today&Forever" is the IID.
4. The client then checks its cache to determine if it already has a URL template for the vanity SID.
5. If the URL template is not in the local cache, the client contacts the routing server and requests the template by sending up the vanity SID.
6. Once the template is located, the client does the same sort of substitution of IID, user ID, etc. into the template as for linkage codes and for UPC codes, and then sends the resulting URL to the browser.

Basically, a vanity code is processed identically to a native linkage code 104 or UPC code 105. A native linkage 104 code or UPC code 105 contains internal fields that act as the Server ID and Item ID. When processing a vanity code, the vanity code key may also be used as both the Server ID and Item ID. The routing server 40 may have a separate list of templates for vanity codes, as distinct from linkage and UPC codes, and the query from the client to the routing server 40 identifies that a vanity code request is being made as opposed to a linkage or UPC code request.

In particular, there are two versions of this scenario:
1. The "template" that is downloaded is, in fact, a pure URL that has no "fill in the blanks." In other words, the entry in the routing server database points not to an information server, but to a plain web page.
2. The template that is downloaded does have some "fill in the blanks" such as the user ID.

Another variant of the vanity code implementation could require that a specific vanity code be directly associated with a specific linkage or UPC code. There are at least two potential implementations of this policy:

1. The query from the client to the routing server 40 could return a response that says, in effect, "treat this as if the user had typed in the following code." The client then does a second round of processing on this returned code (linkage or UPC) as if this code had been typed in originally.

2. Since the routing server 40 knows the Server ID and Item ID (linkage or UPC) to which the vanity code corresponds, it could look up the template corresponding to the Server ID, plug the Item ID into the appropriate spot and return the result as a template.

There are several other aspects of vanity codes that will now be discussed. A vanity code may be printed in conjunction with a native linkage code. Note that the linkage code is all numeric, and contains server ID and item ID fields. The vanity code could be one of two types: structured or unstructured. A structured vanity code consists of a server ID and item ID, separated by one of a predetermined set of characters. For example, using a colon as a separator, the string "ACME:1234" would have "ACME" as the server ID and "1234" as the item ID. An unstructured code would lack the separator character, e.g. "CIGAR". If the bar code were scanned, or the numeric data in the bar code typed in, the linkage client sends the numeric server ID up to the routing server, and receives back a template. The item ID (along with other data) is substituted into the template to produce the final URL. If a structured vanity code were typed in, the process is identical, such that the server ID portion ("ACME" in our example) is sent to the routing server, a URL template is received, and the item ID ("1234") substituted into the template to produce a URL. If an unstructured vanity code were typed in, the system would treat it as the server ID portion, and automatically use "0" as the item ID. Thus, "CIGAR" would be processed as if it had been typed in as "CIGAR:0". In our anticipated usage, the textual server ID ("ACME" or "CIGAR") and the corresponding numeric server ID in the bar code would both map to the same template. Thus, the use of the vanity code versus the use of the bar code produces identical behavior and accesses the same final URL for the customer.

The linkage code symbols 10 of the present invention may be applied to print materials or products, or to a specific page on the World Wide Web. With profiled routing services added to the linkage system, advertisers and publishers may target both print and Internet readers' interests by selecting a data element or combinations of data elements from a list of eligible elements thought to profile interests, specifying data element values or combinations thereof that prompt delivery of a Web page which contains content tailored to those interests. Customers match data element values with Web page information (URLs) using the linkage system information server user interface. The linkage system service providers realize revenue from hits priced according to categories of data selected.

Objective of Profiled Routing

With profiled routing the system enables advertisers and publishers to speak more familiarly with their customers by selecting and delivering Web content tailored to their interests. By so doing, the linkage system adds value to the information delivered to advertisers and to customers that substantiates a business model charging a premium for such services.

Publishers often solicit customers' interests directly via reader response cards and other direct solicitations of customer interest and preference. In the present invention, interests may be inferred from information submitted voluntarily during client registration. Interests may be specified using a combination of directly expressed customer interest, inferred interests from the client registration, and interests gleaned from mining commercially available demographics data stores or data stores collected by other means such as personalization.

Business Methodology

System managers may realize revenue by using profiled routing to deliver more highly qualified prospects for products or promotions. The present system may be offered to both "with" and "without" profiled routing. A "per hit" charge may be assessed based upon imputed values assigned to categories of demographics data. The linkage system may hierarchically rank data categories and charge "per hit" based upon the most highly ranked category present in the expression evaluated to deliver Web content. Alternatively, the linkage system may assess surcharges based upon the sophistication of data element selection criteria; for example, we may assess charge "x" for one selection criteria, e.g., inquirers aged 18 to 34, we may assess charge "y" for two criteria, e.g., Austrian inquirers aged 18–34, etc. An implementation implication is that hits must be logged, and that each hit must be categorized so that the pricing model may be fulfilled.

The universe of data elements available for profiled routing are AGE, GENDER, LANGUAGE, REGION, and user specified data elements solicited via a custom registration presentation. An implementation implication is that database record contents may vary from user to user depending upon the registration process presented.

Certain data types called synthetics are selectable for this feature. Synthetics are data derived from other data. For instance, subtracting the user's birth year from the current year yields AGE. REGION may be derived from a combination of STATE, COUNTRY, and ZIP or POSTAL CODE.

Building a Profile

Customers may specify data element values using simple or complex expressions. Complex expressions may include Boolean operators. Data elements shall be categorized as follows: LANGUAGE (red), AGE, GENDER, REGION (blue), and custom (green). When a hit is logged, that hit should reflect all categories used to effect routing. By logging all categories the system is able to be flexible in support of various pricing models.

A hit routed using an expression that contained LANGUAGE and AGE should show "red" and "blue" in the log record for that hit. For expressions that reference a missing data element, the hit defaults and the log should reflect an undifferentiated, uncategorized hit.

User Interface

The user interface to the profiled routing feature is configured to accept interactive and batch inputs. Batch inputs support mapping large numbers of codes that are inconvenient or impractical to enter one code at a time. The linkage system currently supports the interactive interface via a GUI to the information server. A batch interface is provided via a NLIMPORT utility.

Ideally, the user interface enhanced to support profiled routing should be presented at a level not to exceed the skills of an administrative or clerical employee. However, profiled routing exhibits the most power when customers combine selection criteria with complex expressions.

This suggests two levels of user interface: configuration and list. The configuration interface might support an expression definition tool that permits a more sophisticated administrator to define expressions and associate the expressions with simple identifiers. The list interface would then permit others to use the identifiers to map codes to Web content (URLs).

The user interface shall provide for clear identification of a default URL. Should a registration database record not include a valid value for expression evaluation, the entire expression will be ignored and the default applied. When the default is applied, the resulting hit will be logged "undifferentiated".

In the preferred embodiment, the user interface provides for straightforward replication of selection criteria across multiple codes minimizing repetitious data entry. Users should not have to enter the same selection criteria fifty times to map fifty codes.

USAGE EXAMPLES

The following example demonstrates how the functionality would be provided for a target company subscribing to the linkage server of the present invention.

A soap manufacturers' European operation wishes to introduce a new deodorant soap targeting younger, physically active consumers and wishes to test the market in Austria (AT), only. For Austrian inquirers in the 18–34 age group regardless of gender, the manufacturer wishes to deliver a message that includes links to special promotions. The Linkage Server's customer is an Austrian magazine publisher that has an information server at their site. The magazine publisher's customer is the soap manufacturer who buys one advertisement in an issue of the magazine. The soap manufacturers' art department has prepared three Web pages that describe the new brand of soap: one for the targeted segment (ages 18–34, AT), one for Austrians generally (ages 17 and under, ages 35 and over), and one for all others. The magazine publisher information server administrators would then enter data specifying that AT inquirers in the 18–34 age group be directed to a Web page that includes links to promotions, that other AT inquirers be directed to a second page, and that all others be directed to a third page.

Since the magazine is mapping only one advertisement in one issue of their magazine, the information server's administrators use the interactive interface. In the first instance, hits would be logged "red" and "blue", in the second "red", and in the third undifferentiated hits.

Complex Expression With Replication In Batch

Having successfully test marketed their new deodorant soap in Austria, the soap manufacturer now orchestrates an advertising campaign throughout Europe. Their plan includes advertisements in regional editions of the magazine. The soap manufacturer wishes to deliver identical messages in different languages within some regions, and different messages in other regions. The linkage system's customer is the magazine who has an information server at their site. The soap manufacturers' art department has now prepared fifty Web pages that market the new brand of soap. The soap manufacturer informs the magazine that the first thirty Web pages share viewer selection (profile) criteria excepting language. The magazine's information server administrators would then use the batch interface to map codes. For convenience in administration, the magazine publishers personnel use a selection criteria replication feature to economize keystrokes and eliminate needless repetition.

We claim:

1. A method of providing a primary content file to a client computer comprising the steps of:
   a) inputting into the client computer a linkage code comprising a server identification code and an item identification code;
   b) extracting the server identification code from the linkage code;
   c) retrieving a URL template associated with the server identification code, the URL template comprising the name of an information server and at least one parameter field to be completed by the client computer, which includes an item identification code;
   d) completing the URL template by filling in at least the item identification code obtained from the linkage code previously input into the client computer;
   e) sending the completed URL template to the information server named therein as a primary content URL request;
   f) determining at the information server the location of the primary content file based on the item identification code;
   g) the information server providing the client computer with the primary content file.

2. The method of claim 1 wherein the linkage code is a bar code symbol, and wherein the step of inputting comprises the step of scanning the bar code symbol with a bar code scanning device connected to the client computer.

3. The method of claim 1 wherein the linkage code is a human-readable alphanumeric text string, and wherein the step of inputting comprises the step of typing in the alphanumeric text string with a keyboard connected to the client computer.

4. The method of claim 1 wherein the URL template is retrieved from a local cache stored on the client computer.

5. The method of claim 4 wherein the local cache comprises a plurality of template records, each record comprising a server identification code, an associated URL template, and an expiration date.

6. The method of claim 5 wherein the client computer uses the SID from the linkage code to retrieve the associated URL template and expiration date, and wherein the template record is not used if the current date is later than the expiration date.

7. The method of claim 6 wherein the URL template is retrieved from a routing server when the current date is later than the expiration date.

8. The method of claim 7 wherein the routing server access a template database and returns to the client computer a URL template and a current expiration date associated with the server identification code.

9. The method of claim 8 wherein the client computer updates the local cache with the URL template and the current expiration date received from the routing server.

10. The method of claim 1 wherein the URL template is retrieved from a routing server by sending the server identification code from the client computer to the routing server.

11. The method of claim 10 wherein the routing server uses the server identification code to look up the associated URL template in a template database.

12. The method of claim 1 wherein the URL template is further completed by filling in user data.

13. The method of claim 12 wherein the user data comprises a user identification number.

14. The method of claim 12 wherein the user data comprises the gender of the user.

15. The method of claim 12 wherein the user data comprises the age of the user.

16. The method of claim 12 wherein the user data comprises the preferred language of the user.

17. The method of claim 12 wherein the user data comprises the predefined interests of the user.

18. The method of claim 12 wherein the user data comprises the geographic location of the user.

19. The method of claim 12 wherein the user data is retrieved from memory in the client computer.

20. The method of claim 12 wherein the user data is retrieved from a user database located on a registration server.

21. The method of claim 20 wherein the user database is populated by a user during a registration process.

22. The method of claim 12 wherein the information server uses, in addition to the item identification code, the user data in order to determine the location of the primary content file.

23. The method of claim 1 wherein the information server provides the client computer with the primary content file by redirecting the client computer to a content server computer by sending a primary URL to the client computer indicating the location of the primary content file.

24. The method of claim 1 wherein the information server provides the client computer with the primary content file by providing the primary content file from local storage.

25. The method of claim 13 wherein the information server logs the primary content URL request in a hit log.

26. The method of claim 25 wherein the information server communicates with the registration server to determine further information linked to a user identification code from the hit log.

27. The method of claim 26 wherein the user identification code is obfuscated prior to being sent to the information server.

28. The method of claim 27 wherein the obfuscated user identification code is sent to the registration server.

29. The method of claim 28 wherein the registration server de-obfuscates the user identification code.

30. A computer system configured to provide a primary content file from a content server computer to a client computer over a computer network, comprising:
   a) a client computer interconnected to the computer network; and
   b) an information server computer interconnected to the computer network; wherein
   the client computer comprises:
      means for inputting a linkage code comprising a server identification code and an item identification code;
      means for extracting the server identification code from the linkage code;
      means for retrieving a URL template associated with the server identification code, the URL template comprising the name of an information server and at least one parameter field to be completed by the client computer, which includes an item identification code;
      means for completing the URL template by filling in at least the item identification code obtained from the linkage code previously input into the client computer;
      means for sending the completed URL template to the information server named therein as a primary content URL request; and
   the information server comprises:
      means for determining the location of the primary content file based on the item identification code; and
      means for providing the client computer with the primary content file.

31. The computer system of claim 30 wherein the means for inputting a linkage code comprises a bar code scanning device for scanning a linkage code in the form of a bar code symbol.

32. The computer system of claim 30 wherein the means for inputting a linkage code comprises a keyboard for entering scanning a linkage code in the form of a human-readable alphanumeric text string.

33. The computer system of claim 30 wherein the client computer further comprises a local cache for storing URL templates, and wherein the means for obtaining a URL template accesses the local cache to obtain the URL template.

34. The computer system of claim 31 wherein the local cache comprises a plurality of template records, each record comprising a server identification code, an associated URL template, and an expiration date.

35. The computer system of claim 32 wherein the client computer is adapted to the SID from the linkage code to retrieve the associated URL template and expiration date, and wherein the template record is not used if the current date is later than the expiration date.

36. The computer system of claim 33 further comprising a routing server interconnected to the computer network, and wherein the client computer comprises means for retrieving the URL template from the routing server when the current date is later than the expiration date.

37. The computer system of claim 34 wherein the routing server comprises a template database, and wherein the routing server is configured to return to the client computer a URL template and a current expiration date associated with the server identification code.

38. The computer system of claim 35 wherein the client computer further comprises means for updating the local cache with the URL template and the current expiration date received from the routing server.

39. The computer system of claim 30 further comprising a routing server interconnected to the computer network, wherein the URL template is retrieved from a routing server by sending the server identification code from the client computer to the routing server.

40. The computer system of claim 39 wherein the routing server comprises a template database, and wherein the routing server is configured to use the server identification code to look up the associated URL template in the template database.

41. The computer system of claim 30 wherein the client computer is configured to further complete the URL template by filling in user data.

42. The computer system of claim 41 wherein the user data comprises a user identification number.

43. The computer system of claim 41 wherein the user data comprises the gender of the user.

44. The computer system of claim 41 wherein the user data comprises the age of the user.

45. The computer system of claim 41 wherein the user data comprises the preferred language of the user.

46. The computer system of claim 41 wherein the user data comprises the predefined interests of the user.

47. The computer system of claim 41 wherein the user data comprises the geographic location of the user.

48. The computer system of claim 41 wherein client computer further comprises means for storing user data.

49. The computer system of claim 41 further comprising a registration server computer comprising a user database, and wherein the user data is retrieved from the user database.

50. The computer system of claim 49 wherein the user database is populated by a user during a registration process.

51. The computer system of claim 41 wherein the information server uses, in addition to the item identification code, the user data in order to determine the location of the primary content file.

52. The computer system of claim 30 wherein the means for providing the client computer with the primary content file comprises means for redirecting the client computer to the content server by the information server sending a primary URL to the client computer indicating the location of the primary content file.

53. The computer system of claim 30 wherein the means for providing the client computer with the primary content file comprises means for providing the primary content file to the client computer from local storage.

54. The computer system of claim 42 wherein the information server further comprises a hit log for logging primary content URL requests.

55. The computer system of claim 54 wherein the information server further comprises means for communicating with the registration server to determine further information linked to a user identification code from the hit log.

56. The computer system of claim 55 wherein the user identification code is obfuscated prior to being sent to the information server.

57. The computer system of claim 56 wherein the obfuscated user identification code is sent to the registration server.

58. The computer system of claim 57 wherein the registration server de-obfuscates the user identification code.

* * * * *